(12) United States Patent
Fattal et al.

(10) Patent No.: US 10,590,022 B2
(45) Date of Patent: Mar. 17, 2020

(54) FORMATION OF ELONGATED GLASS COMPONENTS WITH LOW BOW USING A GRIPPER DEVICE

(71) Applicants: HERAEUS QUARTZ NORTH AMERICA LLC, Buford, GA (US); HERAEUS QUARZGLAS GMBH & CO. KG, Hanau (DE)

(72) Inventors: Georges Levon Fattal, Suwanee, GA (US); James E. Beavers, Jr., Flowery Branch, GA (US); Oliver Ganz, Bruchköbel (DE); Kai Huei Chang, Decatur, GA (US)

(73) Assignees: HERAEUS QUARTZ NORTH AMERICA LLC, Buford, GA (US); HERAEUS QUARZGLAS GMBH & CO. KG, Hanau (DE)

( * ) Notice: Subject to any disclaimer, the term of this patent is extended or adjusted under 35 U.S.C. 154(b) by 60 days.

(21) Appl. No.: 15/542,199

(22) PCT Filed: Jan. 22, 2015

(86) PCT No.: PCT/US2015/012471
§ 371 (c)(1),
(2) Date: Jul. 7, 2017

(87) PCT Pub. No.: WO2016/118144
PCT Pub. Date: Jul. 28, 2016

(65) Prior Publication Data
US 2018/0002215 A1   Jan. 4, 2018

(51) Int. Cl.
*C03B 23/045* (2006.01)
*C03B 23/047* (2006.01)
(Continued)

(52) U.S. Cl.
CPC .......... *C03B 23/045* (2013.01); *C03B 23/047* (2013.01); *C03B 37/0124* (2013.01);
(Continued)

(58) Field of Classification Search
CPC . C03B 23/045; C03B 23/047; C03B 23/0006; C03B 23/0093; C03B 23/037;
(Continued)

(56) References Cited

U.S. PATENT DOCUMENTS 5,293,269 A * 3/1994 Burkhart ............... C03B 23/047
359/710
5,968,221 A * 10/1999 Blais ..................... C03B 23/043
65/377
(Continued)

FOREIGN PATENT DOCUMENTS

JP   6-329433    11/1994
JP   H10-81531    3/1998
(Continued)

OTHER PUBLICATIONS

JP 06-040738 English language human translation.*
(Continued)

*Primary Examiner* — Jason L Lazorcik
(74) *Attorney, Agent, or Firm* — Stradley Ronon Stevens & Young, LLP

(57) ABSTRACT

Apparatus and method for producing elongated glass components with low bow. The apparatus may include a heating element to heat a bulk glass component where a strand may be drawn from the bulk glass component in a downward direction and a gripper device including a clamping element to support the strand while pulling or drawing it from the bulk glass component in a linear motion, and a low-friction mounting element attached to the clamping element which allows translational movement of the clamping element in (Continued)

an x-y plane. The gripper device may further be used to reduce bow in the strand while it is being drawn by moving the clamping element on the mounting element in a direction opposite the direction of any measured transverse acceleration.

6 Claims, 16 Drawing Sheets

(51) Int. Cl.
  *C03B 37/012* (2006.01)
  *C03B 37/025* (2006.01)
(52) U.S. Cl.
  CPC .... *C03B 37/0126* (2013.01); *C03B 37/01225* (2013.01); *C03B 37/025* (2013.01)
(58) Field of Classification Search
  CPC ... C03B 23/025; C03B 23/0253; C03B 23/03; C03B 23/035; C03B 23/0124; C03B 23/01242; C03B 23/01225
  See application file for complete search history.

(56) References Cited

U.S. PATENT DOCUMENTS

| | | | | |
|---|---|---|---|---|
| 6,131,414 | A * | 10/2000 | Shimizu | C03B 37/0124 65/378 |
| 6,134,922 | A * | 10/2000 | Shimada | C03B 23/047 65/377 |
| 6,178,778 | B1 * | 1/2001 | Kenmochi | C03B 23/047 65/381 |
| 6,385,998 | B1 * | 5/2002 | Mizuno | C03B 17/04 65/102 |
| 6,386,001 | B1 * | 5/2002 | Shimizu | C03B 23/047 65/377 |
| 6,438,997 | B1 * | 8/2002 | Saito | C03B 37/01205 65/29.14 |
| 6,742,363 | B1 * | 6/2004 | Yamamura | C03B 23/047 65/377 |
| 6,938,442 | B1 * | 9/2005 | Schmitt | C03B 23/045 65/283 |
| 7,600,399 | B2 | 10/2009 | Bogdahn et al. | |
| 2001/0009104 | A1 * | 7/2001 | Wada | C03B 37/0124 65/407 |
| 2002/0139150 | A1 * | 10/2002 | Yokoyama | C03B 37/0124 65/382 |
| 2003/0140658 | A1 * | 7/2003 | Caiata | C03B 23/047 65/402 |
| 2004/0142639 | A1 * | 7/2004 | Kusuyama | C03B 21/02 451/41 |
| 2009/0019893 | A1 * | 1/2009 | Bogdahn | C03B 37/0124 65/108 |
| 2011/0132039 | A1 * | 6/2011 | Otosaka | C03B 23/043 65/435 |
| 2013/0291601 | A1 | 11/2013 | Otosaka | |
| 2017/0084050 | A1 * | 3/2017 | Ma | G01B 11/08 |
| 2017/0254733 | A1 * | 9/2017 | Fattal | C03B 37/01242 |

FOREIGN PATENT DOCUMENTS

| | | |
|---|---|---|
| JP | 10310443 | 11/1998 |
| JP | 2000219530 | 8/2000 |
| JP | 2002-338290 | 11/2002 |
| JP | 2005119933 | 5/2005 |
| JP | 2006117470 | 5/2006 |
| JP | 2006315919 | 11/2006 |
| JP | 3864463 B2 | 12/2006 |
| JP | 2006327898 | 12/2006 |
| WO | 2006/064608 | 6/2006 |

OTHER PUBLICATIONS

JP 10-081531 English language human translation.*
JP 1998-310443 English language human translation.*
International Search Report and Written Opinion for counterpart international patent application No. PCT/US2015/012471 dated Sep. 21, 2015 by the European Patent Office in its capacity as International Search Authority.
Office Action/Notification of Reasons dated Nov. 26, 2018 by the Japanese Patent Office for counterpart Japanese Patent Application No. 2017-536306 (with an English translation attached).
Examination Report dated Oct. 3, 2019 received from the Indian Intellectual Property Office for counterpart Indian Patent Application No. 201747023881.

* cited by examiner

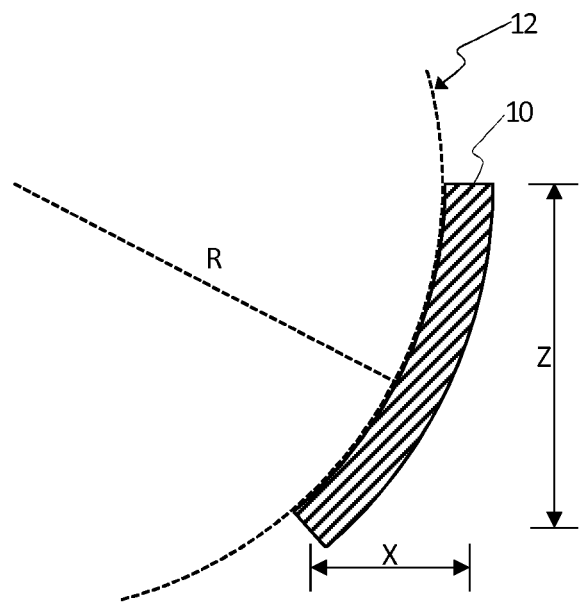
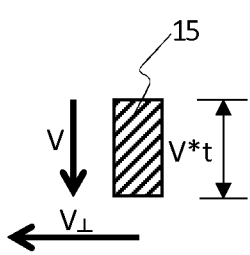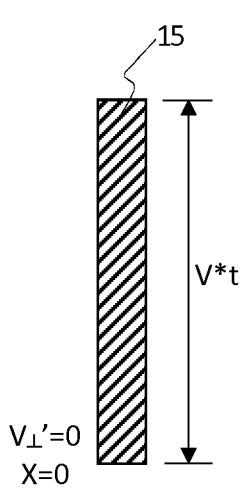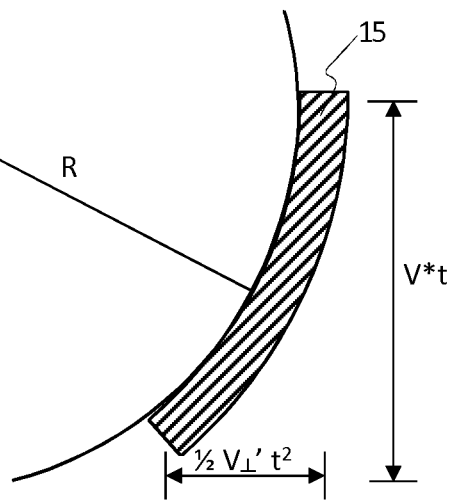
FIG. 1A
FIG. 1B
FIG. 1C
FIG. 1D

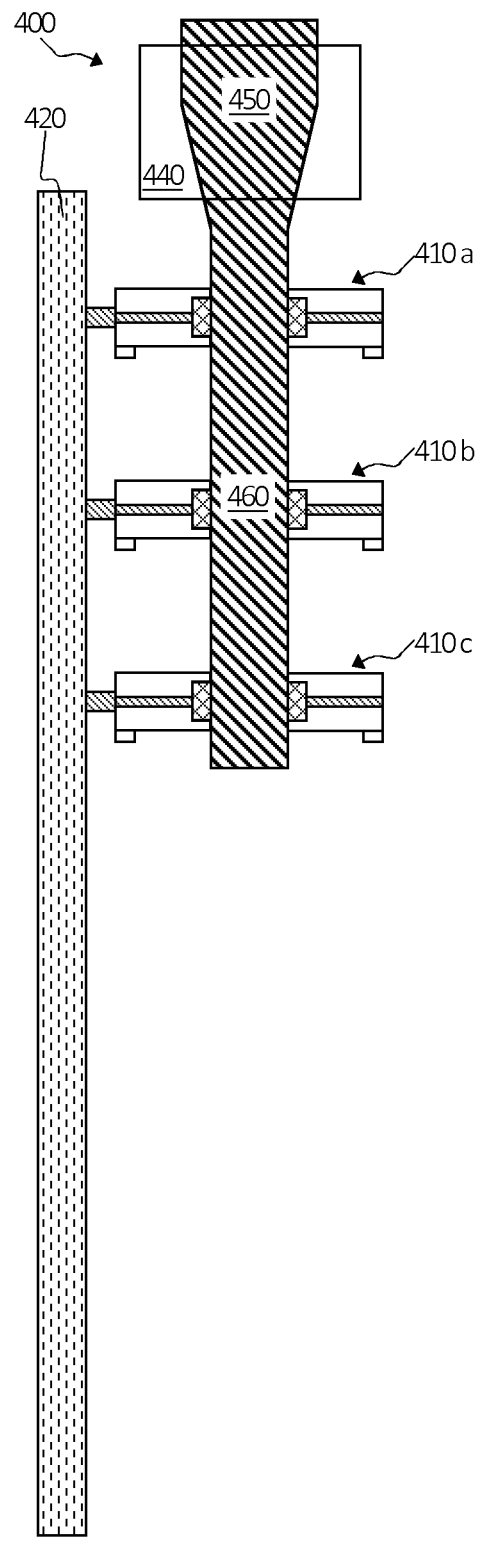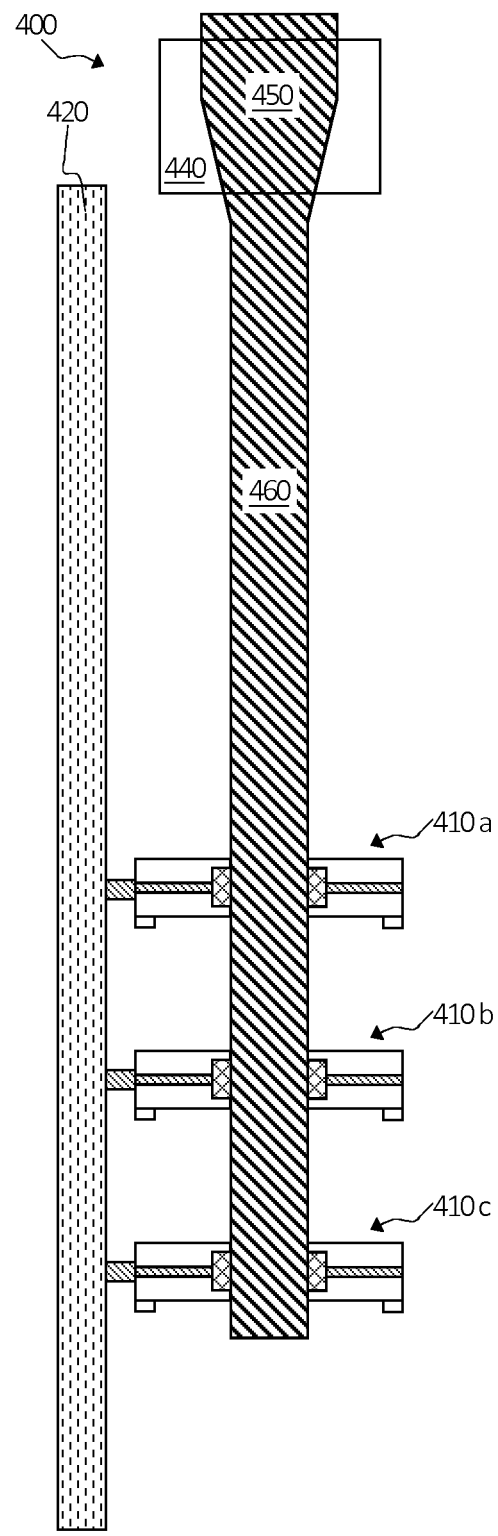
FIG. 4A  FIG. 4B

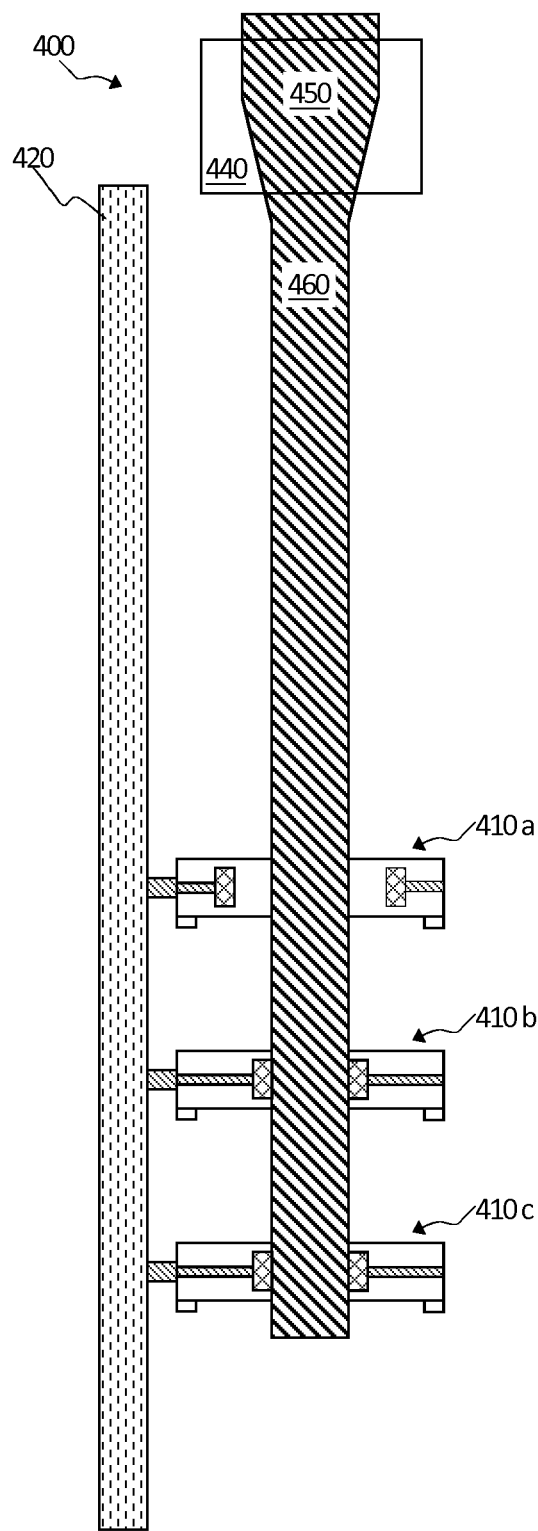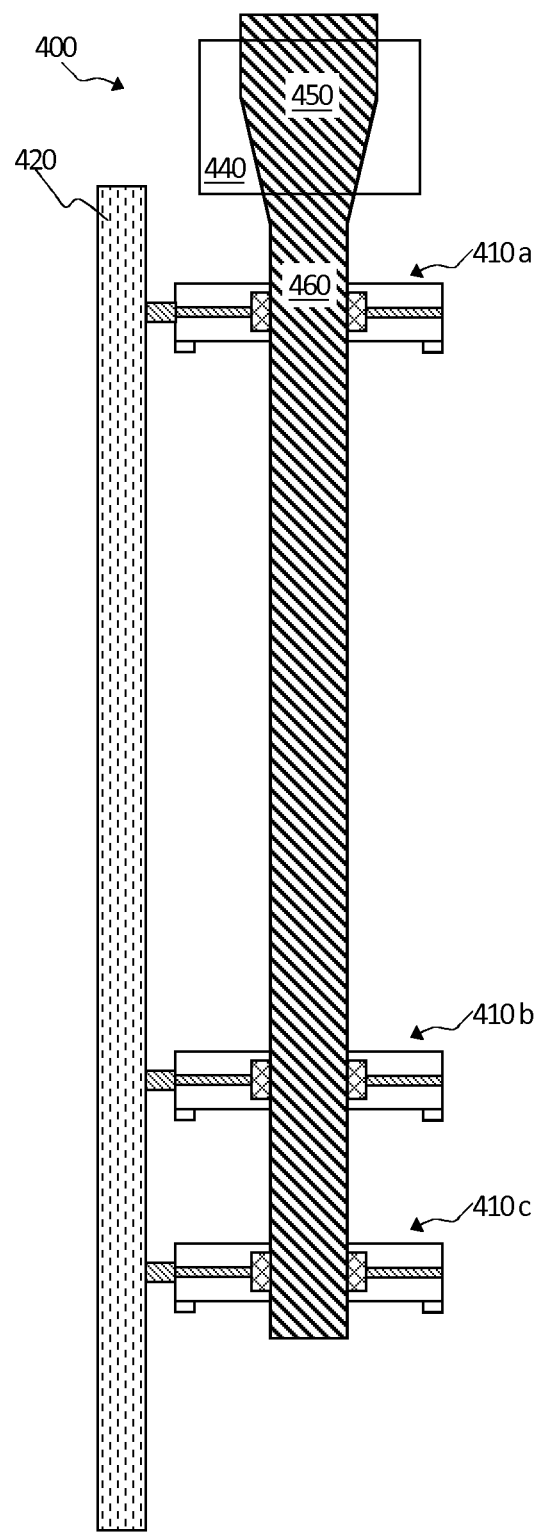
FIG. 4C  FIG. 4D

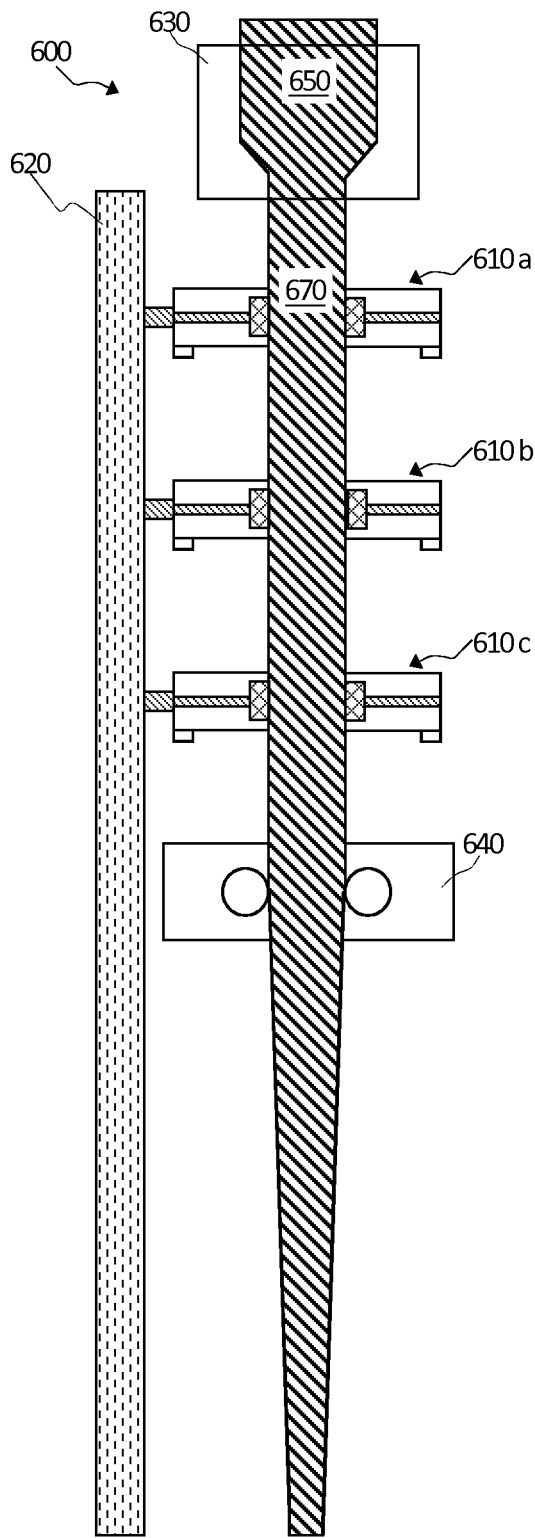 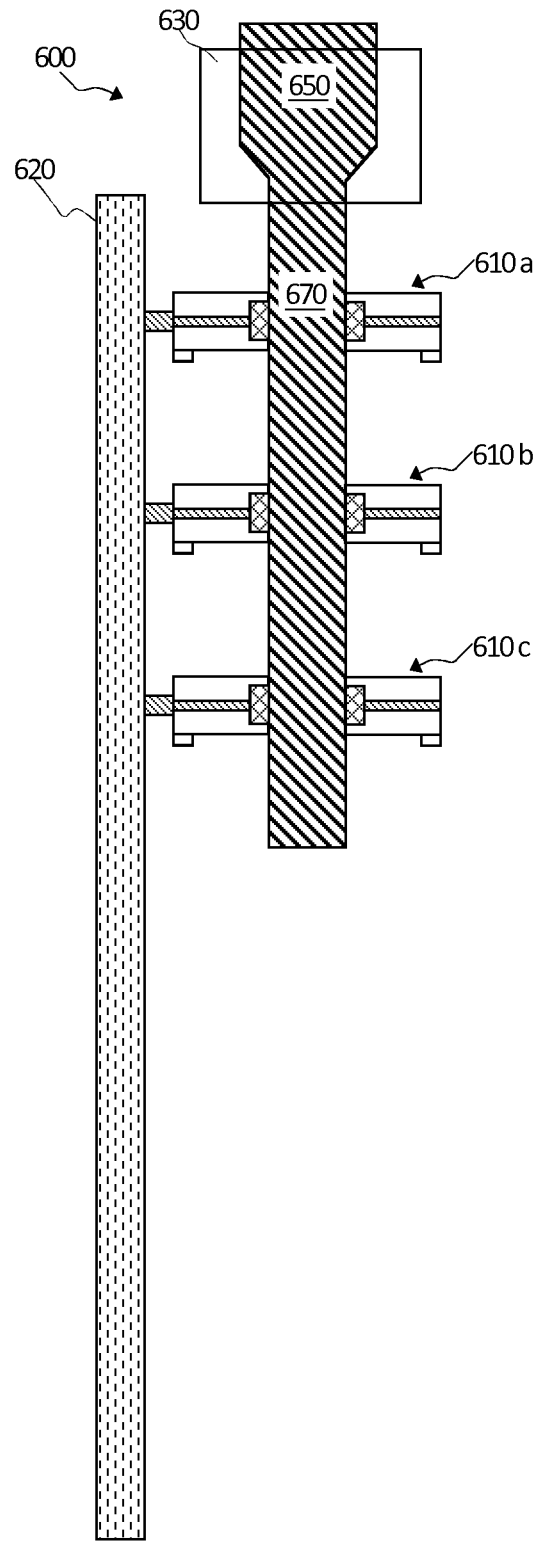
FIG. 5C  FIG. 5D

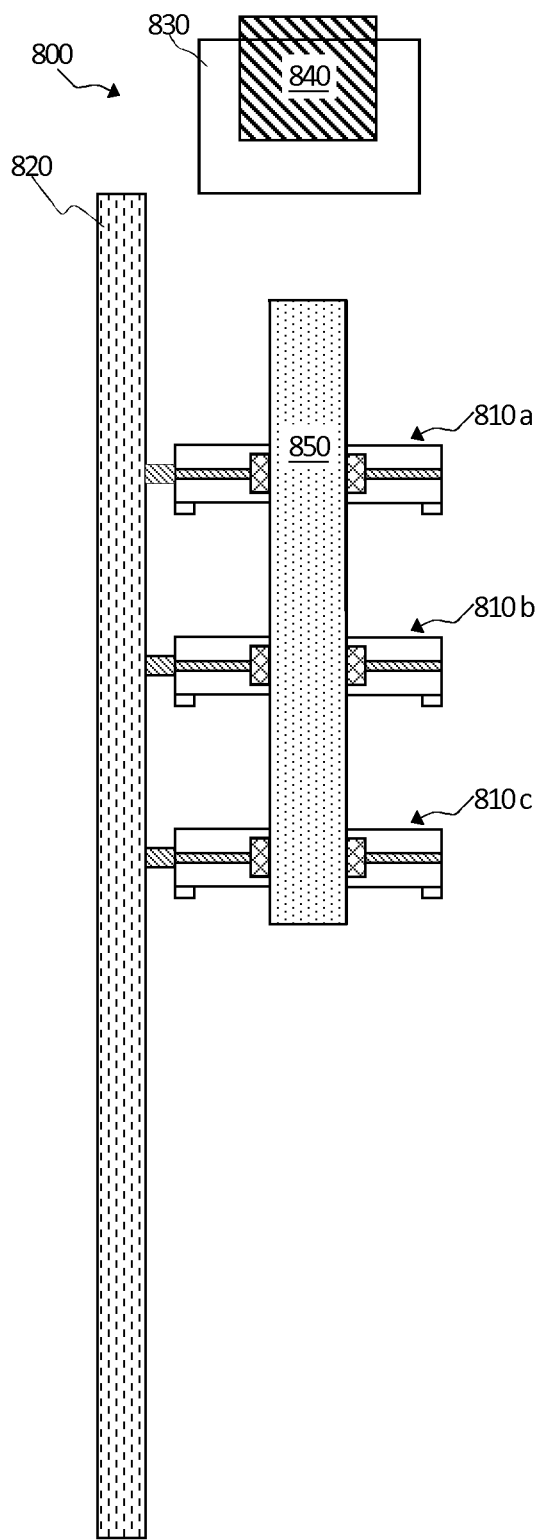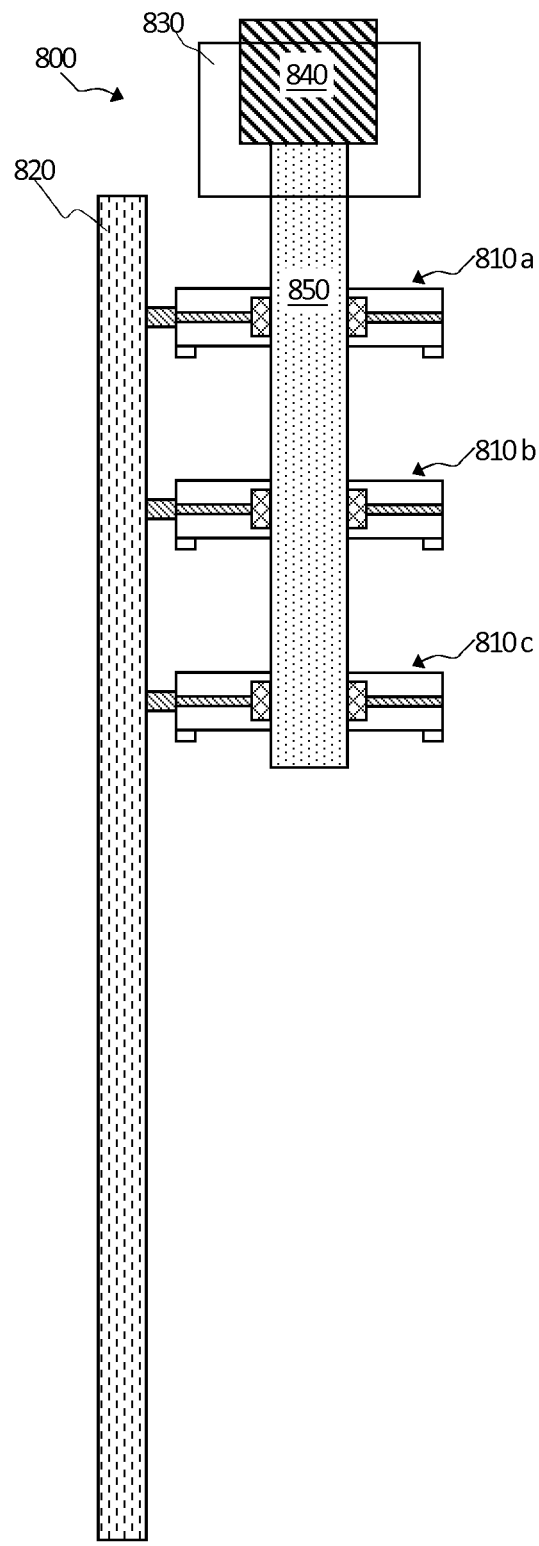
FIG. 7A  FIG. 7B

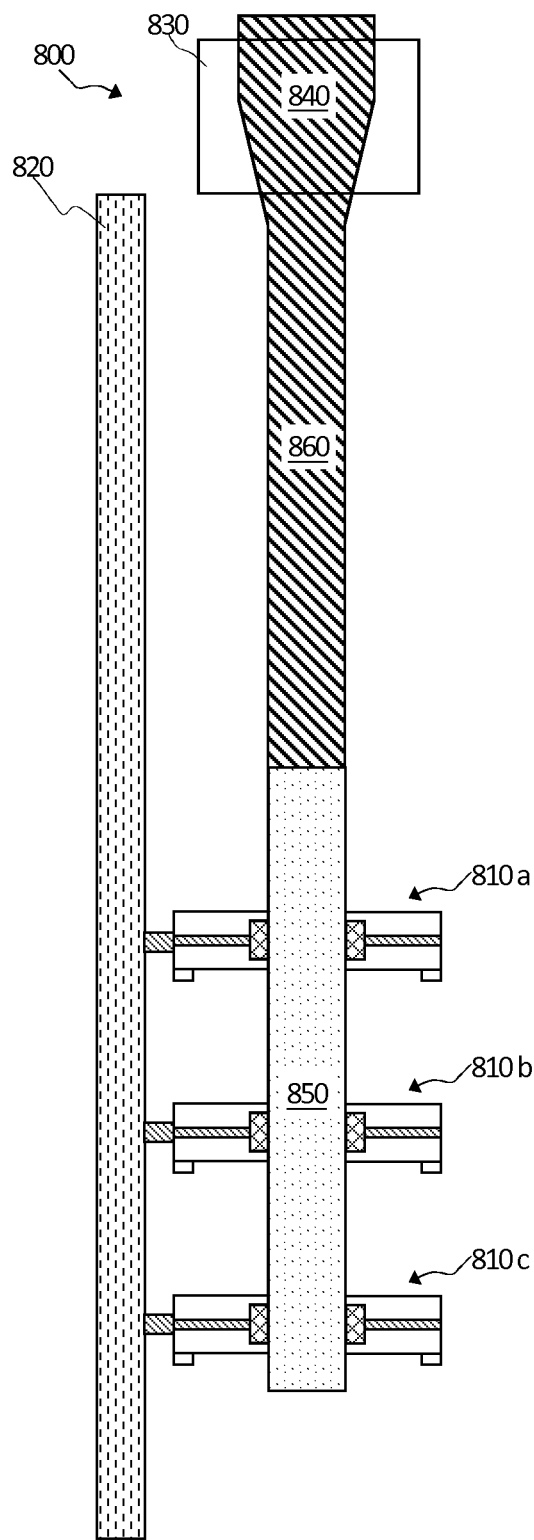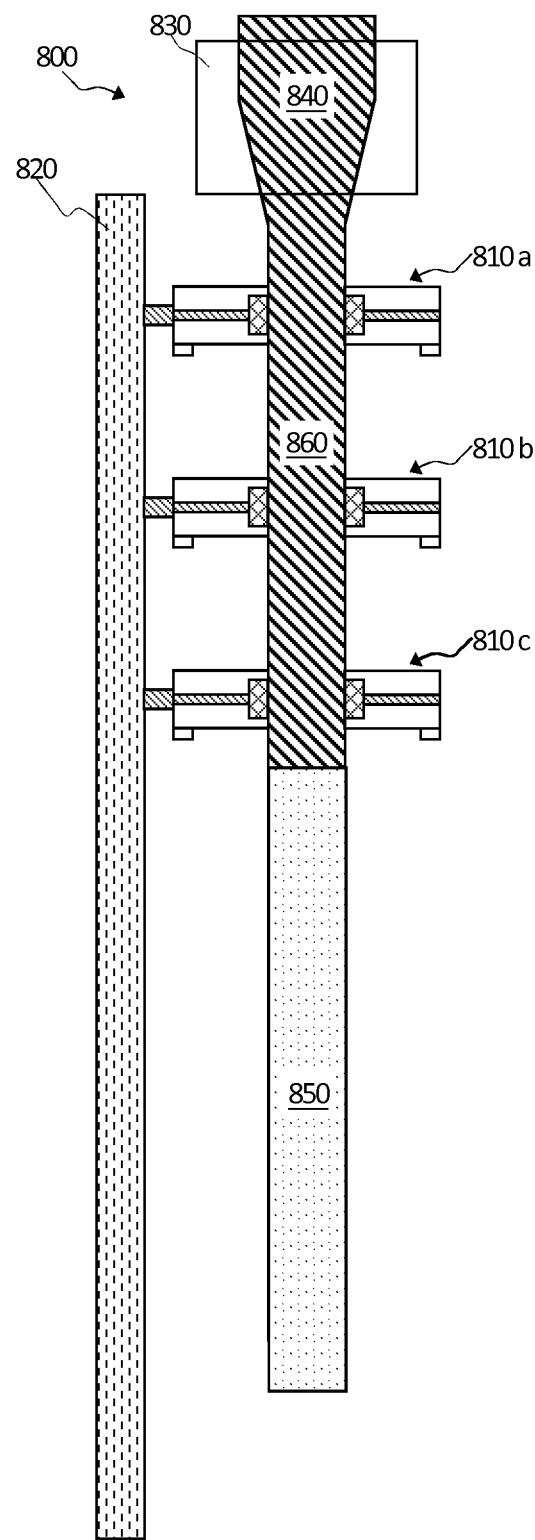
FIG. 7C
FIG. 7D

FORMATION OF ELONGATED GLASS COMPONENTS WITH LOW BOW USING A GRIPPER DEVICE

TECHNICAL FIELD

The present invention relates generally to producing elongated glass components, and particularly to using a gripper system to produce large glass preforms with low bow.

BACKGROUND

Typically, preforms for quartz glass tubing, rods, or collapsed offline rods-in-cylinders (RICs) are produced by introducing a quartz glass component (e.g., a cylinder, an ingot, or an uncollapsed RIC) into an apparatus including a heating zone (e.g., a furnace) in a vertical orientation such that the lower end begins to soften and form a strand. The strand is then placed in a pulling device including one or more sets of pulling wheels. The rate of draw of the strand is controlled by the speed of the pulling wheels, which may apply either a downward or upward force depending on the forming zone temperature or viscosity and the weight of the strand supported by the wheels. Forming is accomplished without the aid of a die thus the strand dimensions are controlled by the feed rate of the quartz glass component, the temperature of the heating zone, and the speed of the pulling wheels.

Alternatively, the preform may be formed by fusing quartz sand by electricity or by flame in a furnace and extracting a strand from the furnace by pulling through a die. The strand is then placed into the pulling device as described above.

In either case, due to the small contact areas between the pulling wheels and the preform, the amount of force that can be applied to the preform by the pulling wheels is limited because excessive pressure can damage the glass surface of the preform. For large preforms that require a greater pulling force than can be applied by a single set of pulling wheels, multiple sets of pulling wheels may be applied to the strand at different levels to achieve the necessary total force. However, multiple sets of pulling wheels increase both apparatus height and cost. Further, low bow can only be achieved with multiple sets of pulling wheels if the sets of pulling wheels are precisely aligned, which is difficult to achieve in practice.

Referring to FIG. 1A, bow is understood to be a degree of curvature in the glass component, such as glass rod 10. In the example depicted in FIG. 1A, the bow for the glass rod 10 with a single radius of curvature can be defined in terms of a horizontal offset x per length Z, or more commonly, by the maximum "camber" (deviation from the straight line "chord") of x/2 over the length Z, all typically expressed as millimeters/meter (mm/m). However, bow may also be described as a radius R of a curvature 12 for any point along the glass component. A greater radius of curvature reflects a lesser degree of bow present for that point of the glass component. In fact, it can be easily shown that to a very good approximation $R=Z^2/(2*x)$ (Equation 1).

Referring to FIG. 1B, a glass component is formed by pulling a molten strand 15 as described above at a linear downward velocity V. This results in a frozen strand length $V*t$ after a time t. However, if the molten strand 15 experiences a transverse or perpendicular force to the glass draw direction V with an acceleration $V\perp'$ (i.e. the time derivative of the transverse velocity $V\perp$) then bow can form and be frozen into the strand. As depicted in FIG. 1C, if $V\perp$ is zero (which also means $V\perp'$ is zero), then after a time t the strand has a length of $V*t$ but the offset x ($=V\perp*t$) remains at zero so the strand is straight and does not have any bow. However, if $V\perp'$ is not zero, then after a time t the strand has a length of $V*t$ but the bottom of the strand is offset by a distance $\frac{1}{2} V\perp'*t^2$, as depicted in FIG. 1D. In the case where both the draw speed V and the transverse acceleration $V\perp'$ are constant, the radius R of the bow in strand 15 will remain constant and it is equal to $V^2/V\perp'$. This can be derived from Equation 1 as follows:

$$Z=V*t$$

$$x=\tfrac{1}{2} V\perp' t^2$$

$$R=Z^2/(2*x)=V^2/V\perp' \quad \text{(Equation 2)}$$

Accordingly, bow is minimized by minimizing the amount of the perpendicular or transverse acceleration $V\perp'$ or equivalent perpendicular or transverse force experience by the molten strand before it is frozen. It is noted that while the pulling direction V is typically substantially vertical to minimize any gravitational contributions to $V\perp'$, the pulling direction V may be in directions other than strictly vertical as long as the transverse force or acceleration is minimized for low bow. In fact, if $V\perp'$ is zero but both V and $V\perp$ are constant the strand can still be pulled straight without bow or curvature in a non-vertical direction with non-zero offset x ($=V\perp*t$).

In general, the bow or curvature of the glass component in any drawing process is simply a frozen record of how the glass is drawn or flows out of the furnace. No matter how complicated the preform or tube curvature is, at any given point (with an infinitesimal length) on the curvature it can always be described by a vector whose magnitude is the radius of curvature and whose direction is defined by the normal vector of the plane that contains the curvature of the infinitesimal length. This is a mathematically rigorous and complete description of any curvature in three dimensional space. The radius of curvature R at any given point can be again given by Equation 2, that is $R=V^2/V\perp'$, just like the example considered above, where V is the instantaneous glass flow velocity at the given point and $V\perp'$ is the acceleration or time derivative of the perpendicular or transverse velocity component $V\perp$ relative to the velocity vector V. These general relationships among the radius of curvature, the draw velocity and the transverse acceleration or force in Equation 2 can easily be seen by noting the close analogy of a particle of mass m moving in a circle of radius R and at speed V: the centripetal force it experiences is ($m*V^2/R$) or the centripetal (i.e. transverse or perpendicular) acceleration is $V\perp'=V^2/R$.

Bow is undesirable for most applications where the input component is a glass rod or preform. Many applications require welding or joining a glass rod with another glass component in a glass working lathe. Bow "runout" or "wobble" in the free end of a chucked quartz rod makes it difficult to achieve a concentric and straight weld. In the case of fiber draw, a handle is welded to the top of the preform. The preform is held by the welded handle above a draw furnace in a chuck or holder and then the bottom of the preform is lowered to the furnace melt zone. Fiber is drawn from the bottom end of the preform. As preform glass is consumed during fiber drawing, the preform is lowered continuously into the melt zone. If the preform has bow, the bottom end of the preform will follow the bow and the melt zone will be offset relative to the center of the draw furnace resulting in undesirable asymmetric glass flow in fiber draw.

Also, in fiber drawing it is often desirable to have the smallest possible annular gap between the preform and a sealing mechanism on the top of the draw furnace. The clearance required is a direct function of the preform bow.

Bow is also undesirable for overclad tubes used in the manufacture of Rod-in-Tube (RIT) optical fiber preforms because bowed overclad tubes make insertion of core rod difficult. The overclad tube bow also in effect results in larger overclad gaps which tend to increase the fiber core eccentricity that is detrimental to optical fiber performance.

Recent attempts have been made to replace fixed-position pulling wheels with guide elements that attach to the strand and are able to move vertically along with the strand. An example of such an attempt may be found in U.S. Pat. No. 6,938,442. However, such devices still require precise alignment of the guide elements to ensure that bow is not introduced into the strand and are not capable of adjusting the position of the guide elements to prevent misalignment. Accordingly, an apparatus for forming glass preforms including adjustable guide elements is desirable.

SUMMARY

The invention provides for an apparatus and methods for forming an elongated glass component with low bow. In one embodiment, the apparatus includes a heating element to heat a bulk glass component where a strand may be drawn from the bulk glass component in a downward z direction, and a gripper device. The gripper device includes a clamping element to support the strand and move linearly with the strand while pulling or drawing it from the bulk glass component in a linear motion and a low-friction mounting element attached to the clamping element which allows translational movement in an x-y plane, where the z direction is defined by the direction in which the strand is drawn. Because the mounting element is low-friction, a force applied to the clamping element by the glass component will result in the clamping element being deflected along the mounting element rather than the clamping element applying a resistive transverse force to the glass component, minimizing the risk of introducing bow.

In another embodiment, an elongated component of glass with low bow may be produced by heating a bulk glass component to form a strand, determining a center of the strand, aligning a clamping element of a gripper device with the center of the strand, and moving the gripper device in a linear downward direction away from the bulk glass component to lengthen the strand. The gripper device further includes a low-friction mounting element attached to the clamping element which allows translational movement of the clamping element in an x-y plane, wherein the z direction is defined by the direction in which the strand is drawn. Because the mounting element is low-friction, the position of the strand is not disturbed by the clamping element clamping to the strand in the event of misalignment.

In another embodiment, bow may be corrected in an elongated component of glass being drawn from a bulk glass component by attaching a gripper device to a strand including a clamping element, and a mounting element attached to the clamping element which allows translational movement of the clamping device in an x-y plane; measuring an amount of transverse acceleration in the strand; and moving the clamping element attached to the strand on the mounting element in the opposite direction of the transverse acceleration to reduce the amount of bow in the strand. The amount of transverse acceleration of the strand may be measured by determining the transverse displacement of the strand at multiple points over time.

BRIEF DESCRIPTION OF DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures:

FIG. 1A is a side view of a bowed glass component;

FIG. 1B is a side view of a glass component with a first drawn length;

FIG. 1C is a side view of the glass component of FIG. 1B after being pulled to a second drawn length without introducing bow;

FIG. 1D is a side view of the glass component of FIG. 1B after being pulled to a second drawn length while introducing bow;

FIG. 4A is a side view of an apparatus for forming a glass strand with low bow including three gripper devices attached to a strand, according to an embodiment of the invention;

FIG. 4B is a side view of the apparatus of FIG. 4A, where the three gripper devices have been moved downward to lengthen the strand, according an embodiment of the invention;

FIG. 4C is a side view of the apparatus of FIG. 4B, where the top gripper device has been detached from the strand, according an embodiment of the invention;

FIG. 4D is a side view of the apparatus of FIG. 4C, where the top gripper device has been reattached to the strand at a higher height, according an embodiment of the invention;

FIG. 5C is a side view of the apparatus of FIG. 5B, where the pulling wheel device has increased the diameter of the strand and the gripper devices have been attached to the strand, according to an embodiment of the invention;

FIG. 5D is a side view of the apparatus of FIG. 5C, where the pulling wheel device has been removed and the strand has been cut, according to an embodiment of the invention;

FIG. 7A is a side view of an apparatus for starting a process for forming a glass strand with low bow including three gripper devices attached to a starting piece separate from and below a bulk glass component in a heating element, according to an embodiment of the invention;

FIG. 7B is a side view of the apparatus of FIG. 7A, where the starting piece has been welded to the bulk glass component, according to an embodiment of the invention;

FIG. 7C is a side view of the apparatus of FIG. 7B, where the three gripper devices have been moved downward to form a strand between the starting piece and the bulk glass component, according to an embodiment of the invention;

FIG. 7D is a side view of the apparatus of FIG. 7C, where the three gripper devices have been detached from the starting piece and reattached to the strand, according to an embodiment of the invention.

DETAILED DESCRIPTION

Figure 2A:
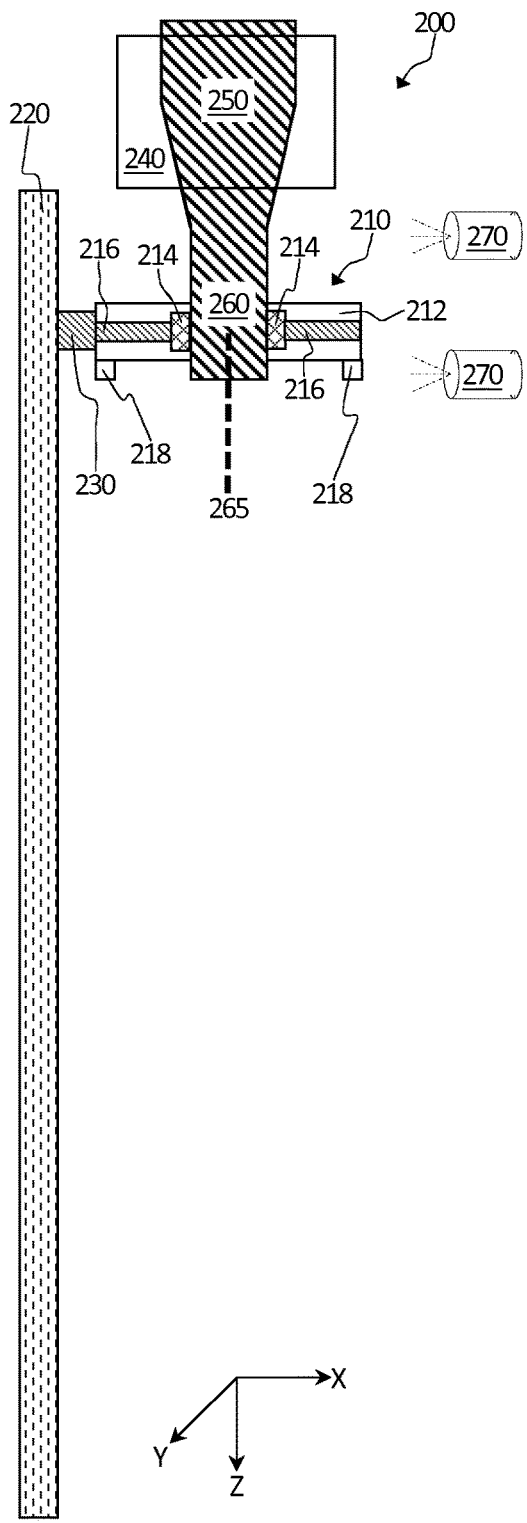
FIG. 2A is a side view of an apparatus for forming an elongated glass component with low bow including a first gripper device attached to a strand, according to an embodiment of the invention.

Referring to FIG. 2A, an apparatus 200 used to form an elongated glass component such as a glass preform is provided. The apparatus 200 includes a gripper device 210 attached to a tower 220, and a heating element 240, such as a furnace. The gripper device 210 includes a frame 212, clamping elements 214, and mounting elements 216 attaching the clamping elements 214 to the frame 212. The gripper device 210 may be mounted along a tower 220 by an attaching element 230 that allows the gripper device 210 to move vertically parallel to the length of the tower 220 (defined in FIG. 1 as the Z direction). In another embodiment, the mounting elements 216 may be attached directly to the tower 220 rather than to the frame 212 or the attaching element 230. The mounting elements 216 allow translational movement of the clamping elements 214 in the X direction and the Y direction (i.e., to any position within the X-Y plane). In one embodiment, the mounting elements 216 are x-y tables including a pair of arms mounted on linear bearings or linear rails and a motor, for example a manual or servo motor drive, to control movement of the arms. The mounting elements 216 are further low-friction devices, so that a force applied to the clamping elements 214 by an external object will result in the clamping elements 214 being deflected along the mounting elements 216 rather than the clamping elements 214 applying a resistive force to the external object.

The apparatus 200 may be used to produce an elongated glass component by first heating a bulk glass component 250 in the heating element 240. As is understood by those skilled in the art, certain steps included in the method may be omitted; certain additional steps may be added; and the order of the steps may be altered from the order illustrated. By heating the glass component 250 in the heating element 240, the lower end of the bulk glass component 250 will soften and form the strand 260 due to gravity and the reduced viscosity of the glass component 250. In other embodiments, the strand 260 may be formed by applying a pressure to the heated bulk glass component 250 to force a portion of the bulk glass component 250 through a die (not shown) in the desired shape of the strand 260. In an exemplary embodiment, the temperature of the heating element 240 may range from approximately 1600° C. to 2200° C. The glass strand 260 may be either a solid cylinder or a tube having a hollow interior and have a cross-sectional area ranging from approximately 1 cm$^2$ to approximately 400 cm$^2$, though greater and lesser cross-sectional areas are explicitly contemplated. It is noted that for a tube, the cross-sectional area does not include the hollow interior of the tube (e.g., for a tube with an outside diameter $d_1$ and an inside diameter $d_2$, the cross-sectional area equals $\pi[(d_1/2)^2-(d_2/2)^2]$). While the strand 260 is typically substantially round, the cross section of the strand 260 is not limited to a circle.

Once the strand 260 has formed, the gripper device 210 may be attached by moving the clamping elements 214 into contact with the strand 260. The clamping elements 214 may be sized to have convex regions having the opposite shape of the strand 260, so that the clamping elements 214 fit securely around the strand 260 without causing damage to the strand 260. In other embodiments, the clamping elements may contact only a portion of the outside surface of the strand 260. In an exemplary embodiment, the clamping elements 214 may be made of a high temperature compressible material such as calcium silicate, asbestos, compressed glass or ceramic fibers (e.g., rock wool) or high temperature rubber (e.g., silicone or fluoropolymer elastomers).

The clamping elements 214 are first aligned with the center of the strand 260 by determining the center of the strand 260 and then moving the clamping elements 214 into alignment with the strand center 265 in the Y direction. In some embodiments, the clamping elements 214 may be aligned to an estimated center of the strand, for example the expected center based on the desired draw path. In other embodiments, in order to more accurately align the clamping elements 214 with the strand 260, the apparatus 200 may further include a sensing element capable of locating the center of the strand and a computer for determining the center of the strand from the output of the sensing element. The sensing element may include one or more laser devices, a camera/vision system, or a mechanical contact (dial indicator) system. In an exemplary embodiment, the sensing element may be attached to the gripper device 212 or may be external to the gripper device, for example attached to the tower 220. In another embodiment, the sensing element may be external to both the gripper device 210 and the tower 220, for example cameras 270. Because the gripper device 210 includes further elements to prevent misalignment, it is not necessary for the gripper device 210 to perfectly aligned with the center of the strand.

Once the clamping elements 214 are aligned, the clamping elements 214 are brought into contact with the strand 260 by movement of the mounting elements 216 in the x direction. The mounting elements 216 may be moved by any suitable means, for example a motor used to control the pair of arms of an x-y table. Because the mounting elements 216 are low-friction devices, if the clamping elements 214 attempt to attach to the strand 260 while not properly aligned with the strand center, the force of the strand 260 pushing against the clamping elements 214 will move the clamping elements 214 into an aligned position instead of the strand 260 being moved. The mounting elements 216 may further include a locking mechanism that may be engaged and disengaged to prevent movement of the clamping elements 214 once the clamping elements are attached to the strand 260. While the clamping elements 214 are being moved into position, the locking mechanism is unlocked, so that the clamping elements 214 may be moved by the motor while still being displaced by any additional force applied to the clamping elements 214. Once the clamping elements 214 are in contact with the strand 260, the locking mechanism is engaged to prevent further movement of the clamping elements 214 in the X-Y plane.

To detect misalignment, in one embodiment the gripper device 210 further includes a force sensing device 218, such as load cells, to sense reaction forces to measure the reaction force that occurs during the process of the clamping elements 214 attaching to the strand 260. Load cells are transducers that convert a force applied to the clamping elements 214 to a strain gauge (not shown) of each load cell into an electrical signal. The electrical signal may then be measured and correlated to the force applied to the strain gauge. Exemplary load cells include hydraulic load cells, pneumatic load cells, and strain gauge load cells. Should the clamping elements 214 not be properly aligned the center of the strand 260, the reaction force will be greater than if the clamping elements 214 are properly aligned. By measuring the reaction force with the force sensing element 218, misalignment may be detected and corrected before the clamping elements 214 apply a force to the strand 260 sufficient to result in movement of the strand 260. In one embodiment, the force sensing device 218 may be used in conjunction with the low-friction mounting elements 216, where the speed at which the clamping elements 214 are attached to the strand 260 is slowed in response to a greater than expected reaction force in order to allow the clamping elements 214 to move on the mounting elements 216 into an aligned position. In an exemplary embodiment, the clamping elements 214 may be moved toward the strand 260 at a rate ranging from approximately 50 mm/min to approximately 100 mm/min while no misalignment is detected by the force sensing device 218, and the rate reduced to approximately 10 mm/min to approximately 25 mm/min if misalignment is detected. In other applications, the clamping speeds may exceed these ranges.

Figure 2B:
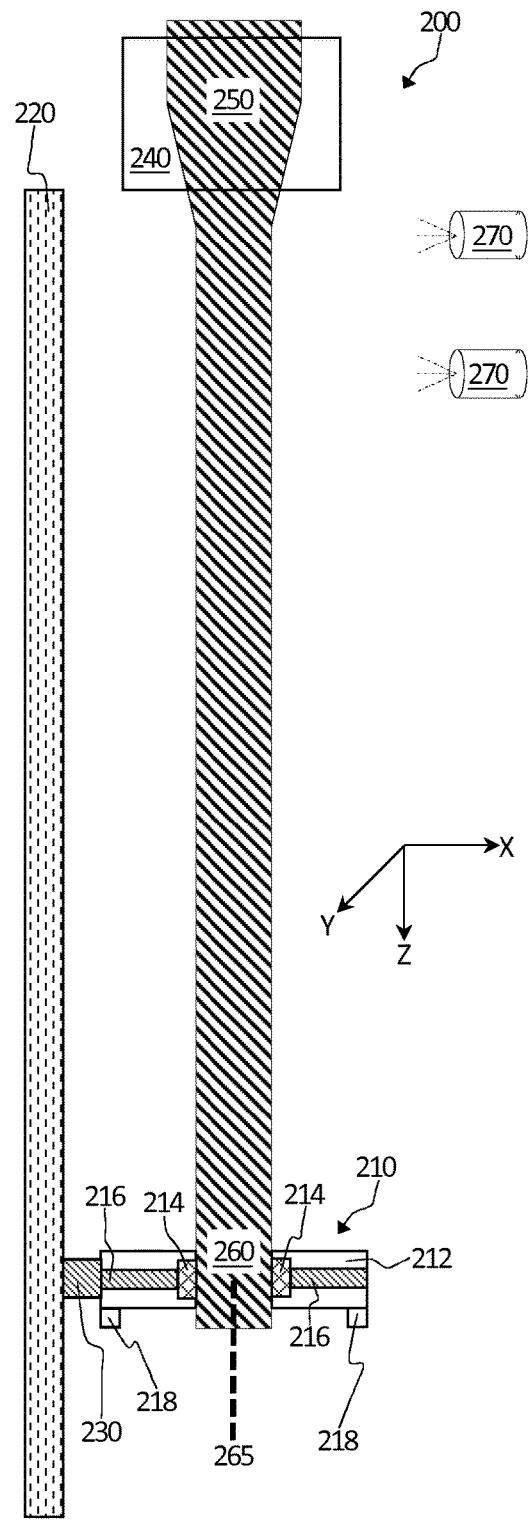
FIG. 2B is a side view of the apparatus of FIG. 2 after the strand has been drawn to a second length, according to an embodiment of the invention.

Referring to FIG. 2B, once the clamping elements 214 are properly aligned and attached to the strand 260, the gripper device 210 may be moved downward to draw the strand 260 to a longer length. A motor attached to the tower 220 may be used to control the rate at which the gripper device 210 is moved. The rate at which the gripper device 210 is moved downward controls the rate at which the strand is drawn and may range from approximately 0.2 mm/s to approximately 2.5 mm/s, though greater and lesser rates are explicitly contemplated.

Once the strand 260 reaches a desired length, the strand 260 may be cut and the gripper device 210 moved back to its original position and reattached to the strand 260. While the desired length of the strand 260, like the cross-sectional area of the strand 260 is application-specific, in an exemplary embodiment the desired length may range from approximately 1 m to approximately 3 m, with shorter and longer lengths explicitly contemplated.

Referring to FIGS. 3A-3D, embodiments further include using an apparatus 300 including a gripper device 310 (FIG. 3B) attached to a tower 320, and a heating element 340, such as a furnace to correct bow in a glass strand 360 including a bowed portion 365 during the draw process. Like the gripper device 210 described above in conjunction with FIGS. 2A-2B, the gripper device 310 includes a frame 312, clamping elements 314, and mounting elements 316 attaching the clamping elements 314 to the frame 312. The clamping elements 314 and the mounting elements 316 have the same features as described above for the clamping element 214 (FIGS. 2A-2B) and the mounting element 216 (FIGS. 2A-2B), respectively. The gripper device 310 may be mounted along the tower 320 by attaching element 310 that allows the gripper device 310 to move vertically parallel to the length of the tower 320. In another embodiment, the mounting elements 316 may be attached directly to the tower 320 rather than to the frame 312 or the attaching element 330.

Figure 3A:
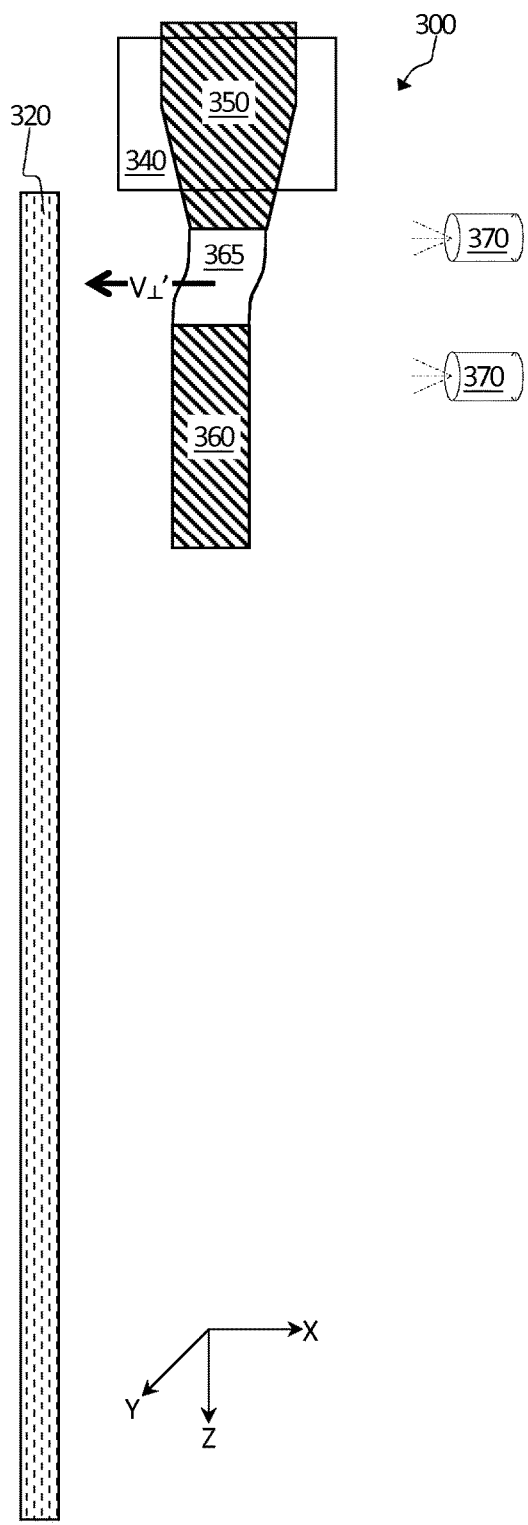
FIG. 3A is a side view of an apparatus producing a bowing strand, according an embodiment of the invention.
Figure 3B:
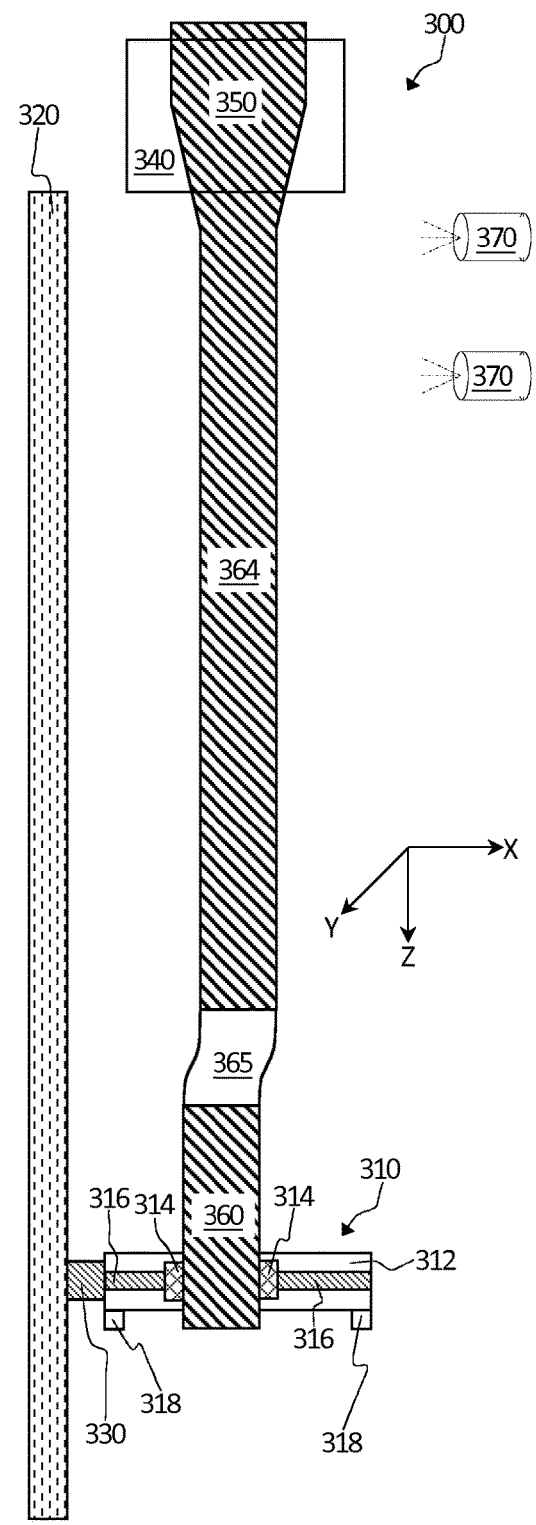
FIG. 3B is a side view of the apparatus of FIG. 3A, after a gripper device has been attached to the bowed strand and pulled down linearly to prevent bow from propagating in the strand, according an embodiment of the invention.

In FIG. 3A, the glass strand 360 is being formed from a bulk glass component 350. Because of a transverse acceleration $V\perp'$ in the forming zone (i.e., the zone at and slightly below the heating element 340), the bowed portion 365 forms in the strand, offsetting the strand 360 from the desired draw axis. The transverse acceleration $V\perp'$ in the strand may be determined by measuring its transverse offset or displacement at multiple points over time using cameras 370 (e.g., laser, LED or camera gauges) which track the position of the strand 360 (including bowed portion 365). The cameras 370 are preferably positioned at or immediately below the heating element such that they measure the strand position before the strand has solidified.

The gripper device 310 may be used to reduce the impact of bow in the strand in two ways. First, as depicted in FIG. 3A, if the bowed portion 365 has cooled to the point of no longer being malleable and the transverse acceleration has diminished, the gripper device 310 may attach to the strand 360 in the offset position and continue pulling down linearly. As a result, the strand portion 364 above the bowed portion will exit the forming zone without any bow and the effect of the initial transverse acceleration $V\perp'$ will not propagate further. In contrast, an apparatus including a plurality of pulling wheels will always need to follow the existing or drawn preform curvature causing the top end of the solidified glass to sway in the x-y plane which will induce new bow from the molten glass and thereby further propagate or even amplify the bow problem. In effect, unless the pulling wheels are perfectly aligned and the drawn preform within the pulling wheels is perfectly straight (i.e. no bow), the pulling wheels will always convert some of the draw or pulling motion into a transverse acceleration component V⊥' at the molten glass, resulting in additional bow. In summary, the strictly linear pulling motion of the gripper system can: (1) minimize the transverse force or acceleration V⊥' experienced by the molten glass, (2) decouple any existing curvature or bow in the drawn preform from subsequent draw and prevent further bow formation and propagation, and (3) allow bow to recover or return to a low level after transient transverse V⊥' disturbances as long as the strictly linear pulling motion is maintained—all of these help to achieve low bow in draw.

Figure 3C:
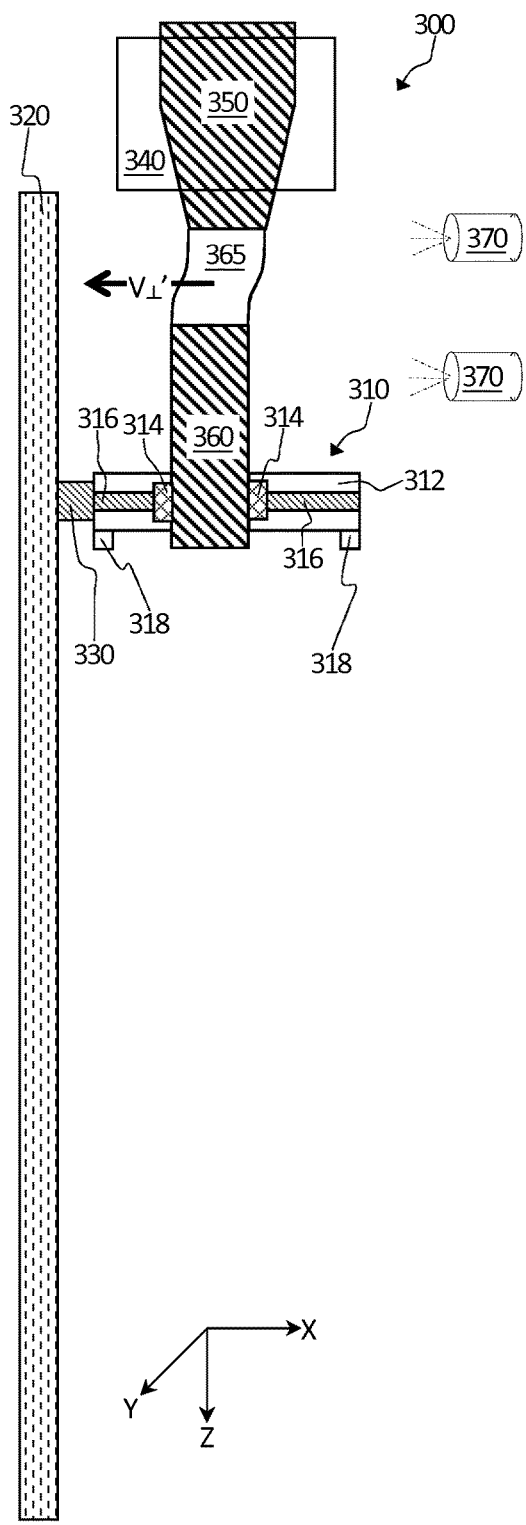
FIG. 3C is a side view of the apparatus of FIG. 3A after a gripper device has been attached to the bowing strand, according an embodiment of the invention.
Figure 3D:
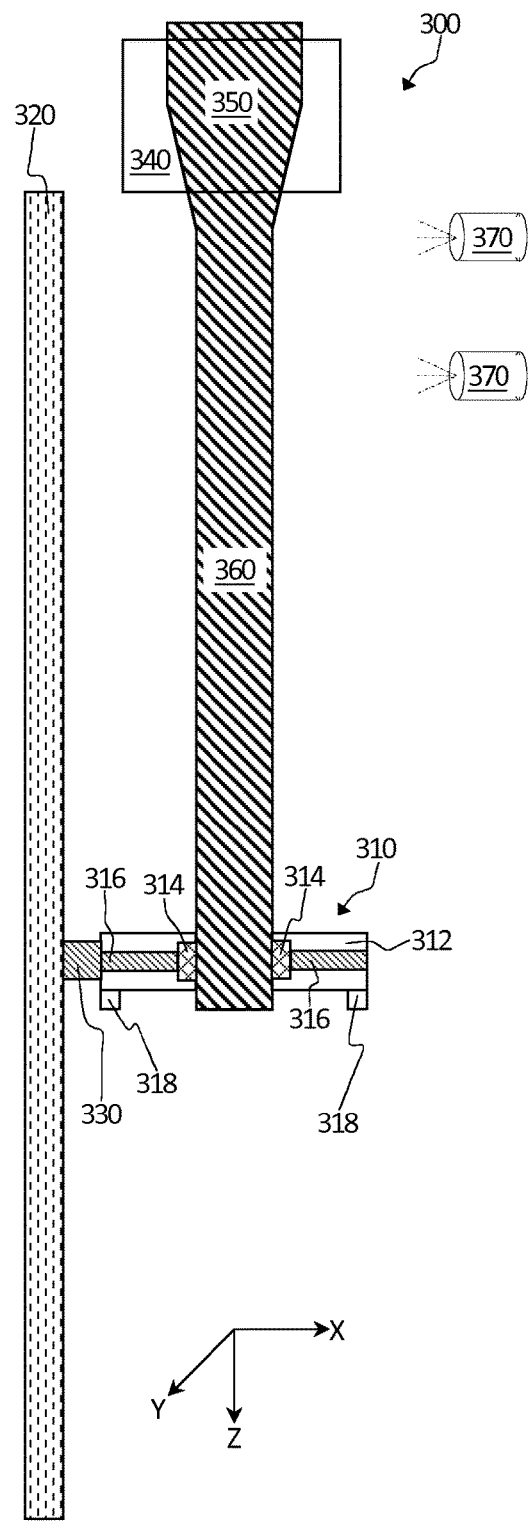
FIG. 3D is a side view of the apparatus of FIG. 3C, after the gripper device has been moved the strand to dampen transverse acceleration in the forming zone, according an embodiment of the invention.

As depicted in FIGS. 3C-3D, if the bowed portion 365 has not yet solidified (FIG. 3C), the gripper device 310 may move the strand 360 in the direction opposite the bow to apply a force to dampen or negate the transverse acceleration V⊥', thereby preventing bow from forming in the strand 360 (FIG. 3D). Accordingly, the gripper device 310 can both correct for transverse acceleration to prevent bow from forming and also adapt to bow already present in the strand and prevent it from causing any additional bow in subsequent preform draw.

Referring to FIGS. 4A-4J, embodiments further include methods of producing an elongated glass component using multiple gripper devices attached to a strand. As is understood by those skilled in the art, certain steps included in the method may be omitted; certain additional steps may be added; and the order of the steps may be altered from the order illustrated. While FIGS. 4A-4J depict an apparatus 400 including three gripper devices (a top gripper device 410a, a middle gripper device 410b, and a bottom gripper device 410c) attached to a tower 420, and a heating element 440, such as a furnace, other embodiments may include one gripper device (as described above in conjunction with FIGS. 2A-2B), two gripper devices, or four or more gripper devices. The top gripper device 410a, the middle gripper device 410b, and the bottom gripper device 410c are substantially similar to the gripper device 210 described above. The gripper devices 410a-410c may be mounted along a tower 420 that allows the gripper devices 410a-410c to move vertically parallel to the length of the tower 420.

Figure 4E:
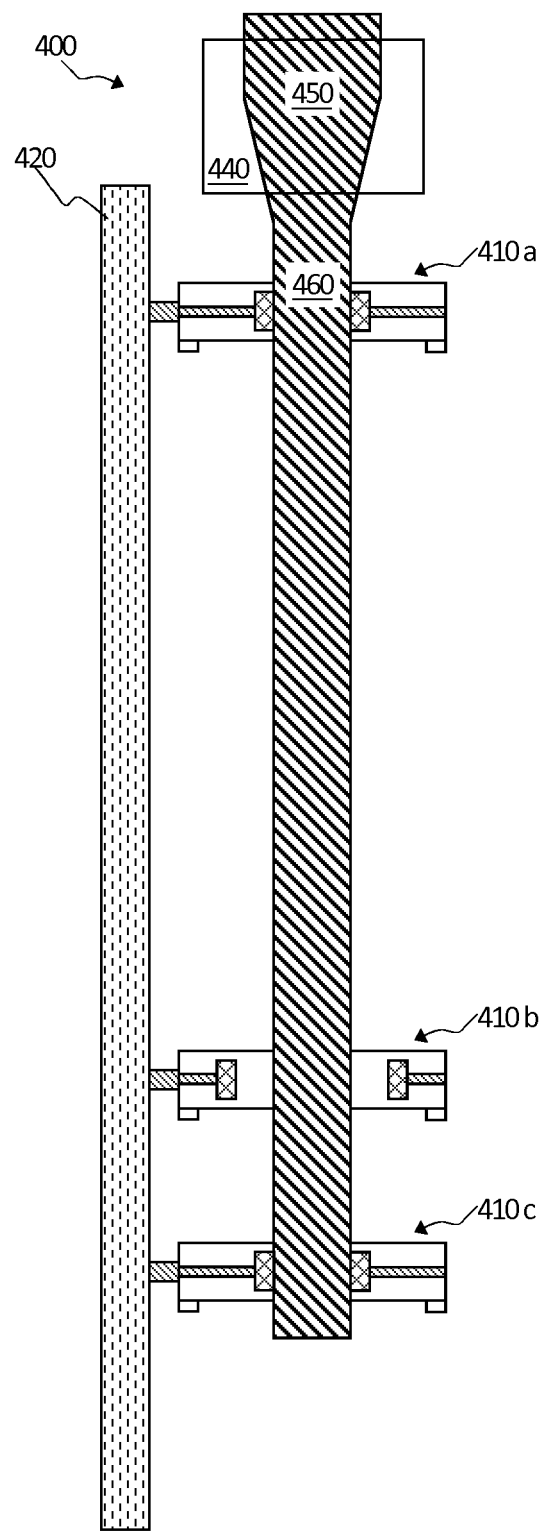
FIG. 4E is a side view of the apparatus of FIG. 4D, where the middle gripper device has been detached from the strand, according an embodiment of the invention.
Figure 4F:
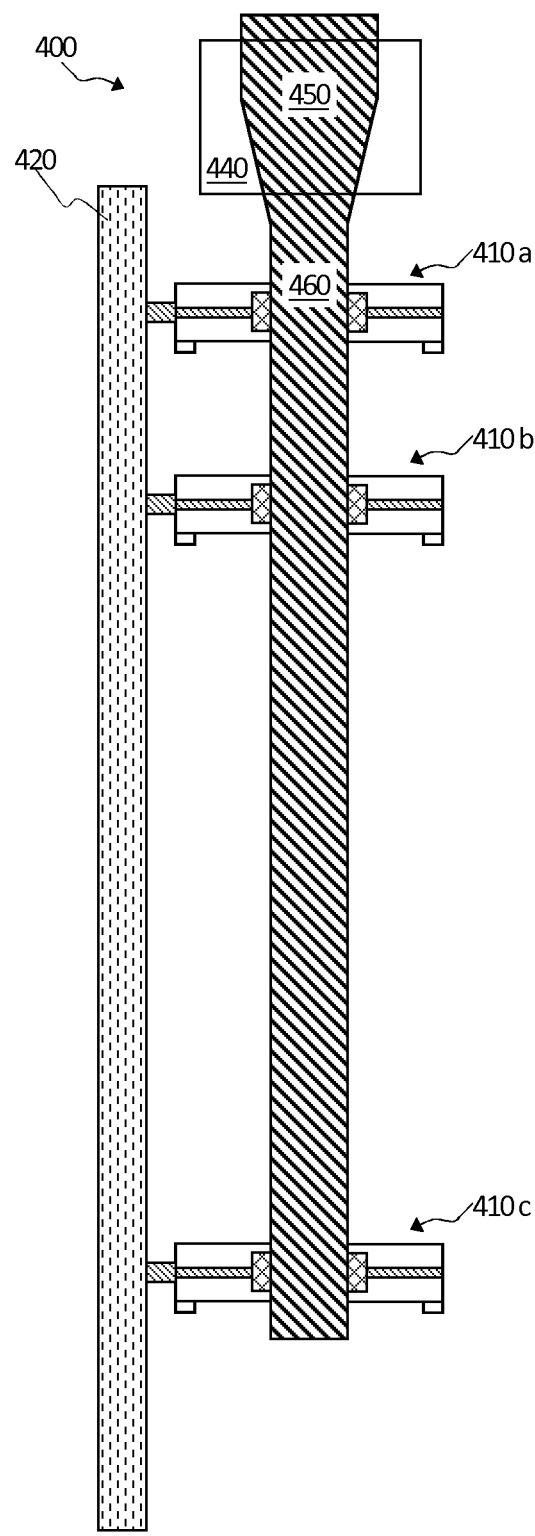
FIG. 4F is a side view of the apparatus of FIG. 4E, where the middle gripper device has been reattached to the strand at a higher height below the top gripper device, according an embodiment of the invention.
Figure 4G:
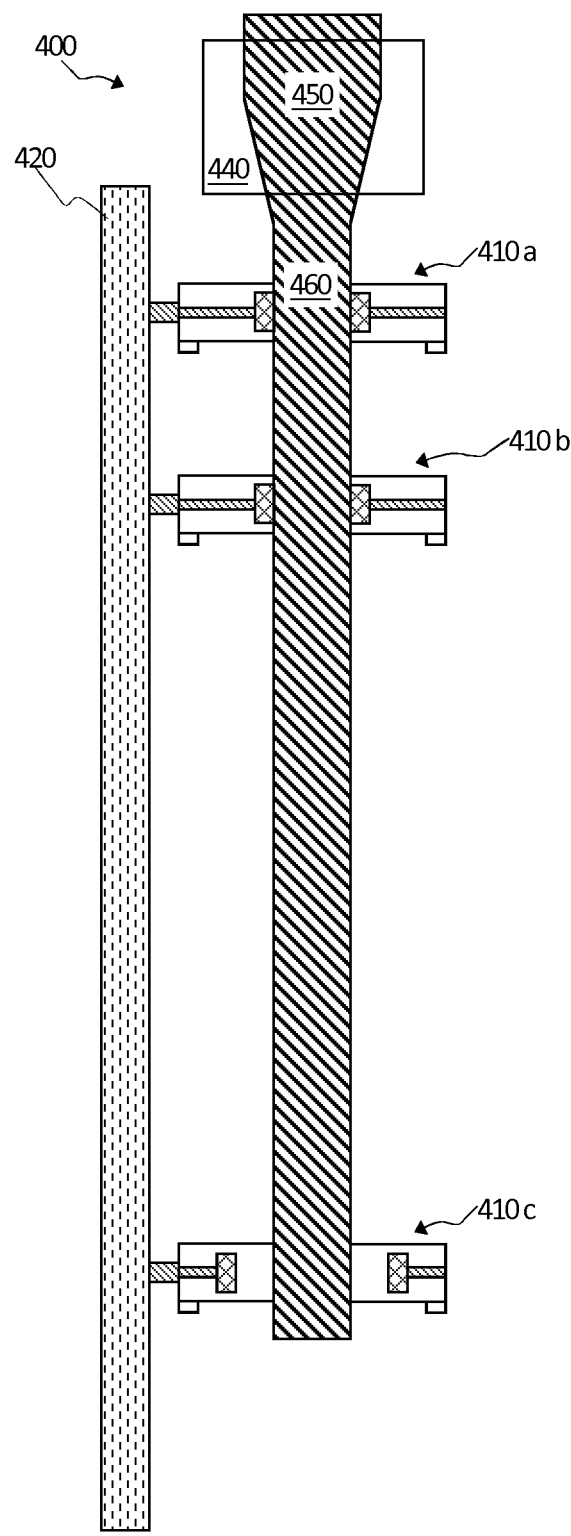
FIG. 4G is a side view of the apparatus of FIG. 4F, where the bottom gripper device has been detached from the strand, according an embodiment of the invention.
Figure 4H:
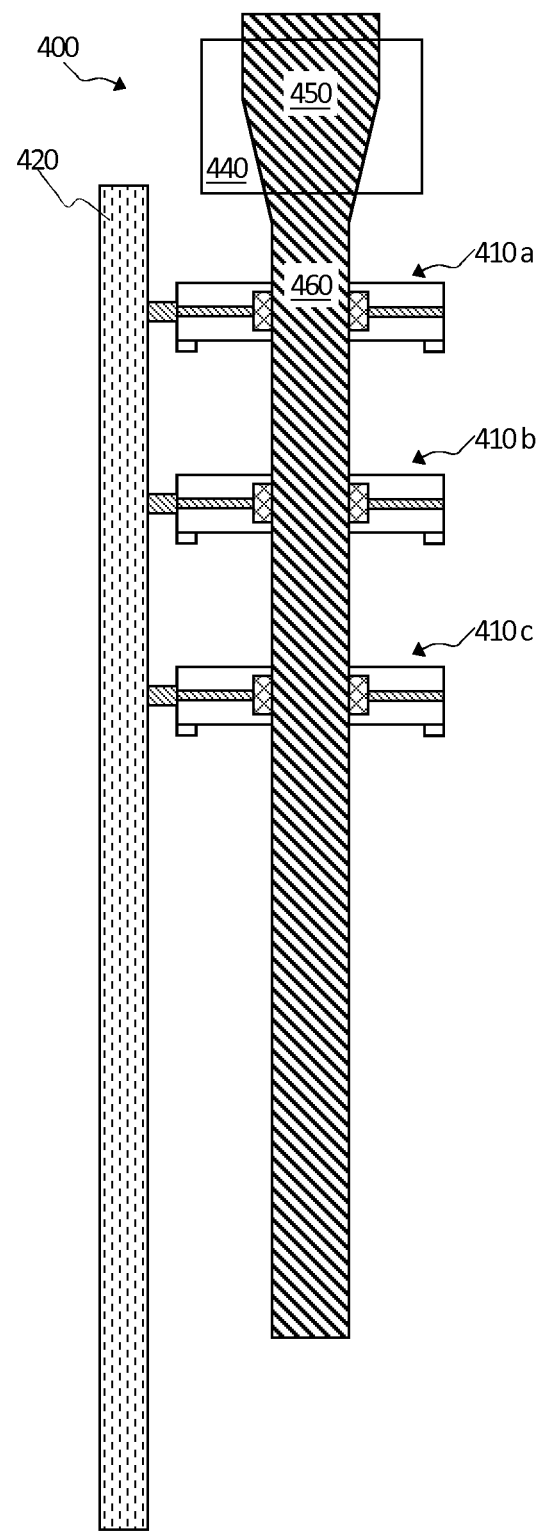
FIG. 4H is a side view of the apparatus of FIG. 4G, where the bottom gripper device has been reattached to the strand at a higher height below the middle gripper device, according an embodiment of the invention.
Figure 4I:
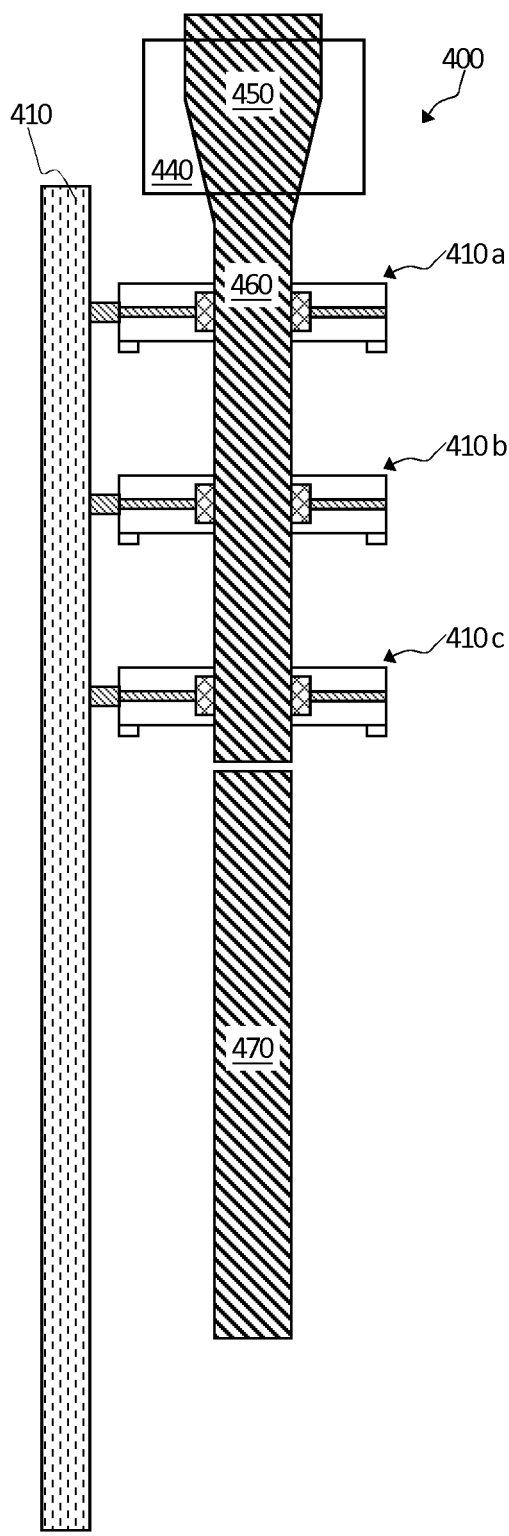
FIG. 4I is a side view of the apparatus of FIG. 4H, where the strand has been cut below the bottom gripper device, according an embodiment of the invention.
Figure 4J:
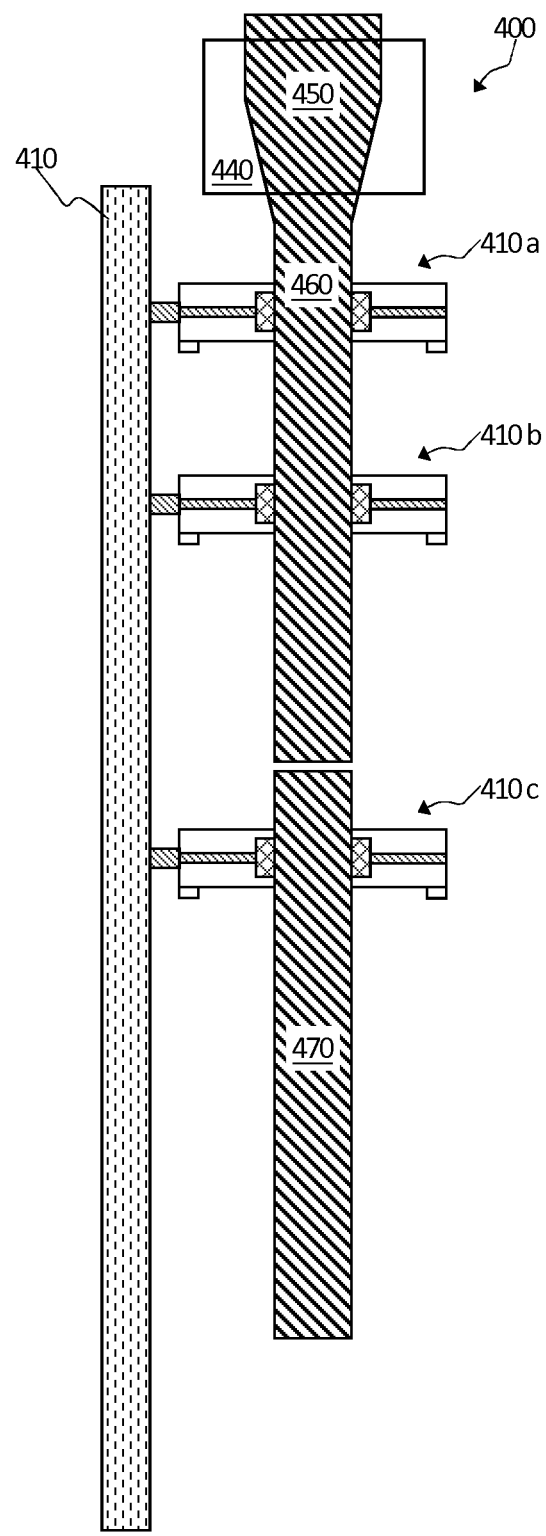
FIG. 4J is a side view of the apparatus of FIG. 4H, where the strand has been cut above the bottom gripper device, according an embodiment of the invention.

Referring to FIG. 4A, the gripper devices 410a-410c are attached to the strand 460 as described above for attaching the gripper device 210 to the strand 460. In FIG. 4A, a strand 460 is being drawn from a bulk glass component 450, with the gripper devices 410a-410c distributed along the length of the strand 460. Methods of beginning the production process are described in greater detail below in conjunction with FIGS. 5A-5D, 6A-6D, and 7A-7E. Referring to FIG. 4B, the gripper devices 410a-410c are moved down the tower 420 to draw the strand 460 to a longer length. Referring to FIG. 4C, the top gripper device 410a is unattached from the strand 460 while the strand 460 remains supported by the middle gripper device 410b and the bottom gripper device 410c. Referring to FIG. 4D, the top gripper device 410a is moved back toward the top of the strand 460 and reattached to the strand 460. Referring to FIG. 4E, once the top gripper device 410a is reattached to the strand 460, the middle gripper device 410b is unattached from the strand 460 while the strand 460 remains supported by the top gripper device 410a and the bottom gripper device 410c. Referring to FIG. 4F, the middle gripper device 410b is moved back toward the top of the strand 460 and reattached to the strand 460 below the top gripper device 410a. Referring to FIG. 4G, once the middle gripper device 410b is reattached to the strand 460, the bottom gripper device 410c is unattached from the strand 460 while the strand 460 remains supported by the top gripper device 410a and the middle gripper device 410b. Referring to FIG. 4H, the bottom gripper device 410c is moved back toward the top of the strand 460 and reattached to the strand 460 below the middle gripper device 410b. Referring to FIG. 4I, once the bottom gripper device 410c is reattached to the strand 460, the portion 470 of the strand 460 below the bottom gripper device 410c is removed, for example by a draw or snap cut. In an alternate embodiment depicted in FIG. 4J, the strand 460 may be cut above the bottom gripper device 410c so that the bottom gripper device 410c may be used to lower the portion 470 of the strand 460 into a waiting receptacle (not shown).

As can be seen from the above description, using multiple gripper devices allows the strand to always be supported by at least one gripper and up to one less than the total number of grippers during the draw process. In the above example with three gripper devices 410a-410c, the strand 460 is always supported by at least two of the gripper devices 410a-410c. The more gripper devices attached at a given time, the more rigid the strand 460 will be and the greater force will be required to disrupt the strand from the desired draw path (i.e., the more difficult it will be to introduce the transverse force or acceleration V⊥'). Strand rigidity is also dependent on the spacing between the attached gripper devices, so more gripper devices may be used for longer strands. While not shown in the figures, it will be understood that each of the gripper devices is moving down at a constant desired rate while attached the strand, thereby allowing for a continuous draw process. A person of ordinary skill in the art will understand how to synchronize the movement of the multiple gripper devices to maintain the desired spacing between the gripper devices while cutting portions of the desired lengths from the strand.

It is noted that the process depicted in FIG. 4A-4J is a steady-state process where the process is already underway. In one embodiment, the preform production process may be formed by starting a drip from the bulk glass component, and then performing the method of FIGS. 4A-4J after attaching the gripper devices to the drip. By pulling down on the drip at a rate slower than softened glass exits the oven, the diameter of the drip may be increased until it reaches the desired diameter and forms the strand, at which point the gripper devices may pull faster to begin the steady-state process. Referring to FIGS. 5A-5D, 6A-6D, and 7A-7E, various methods may be used to begin the production process described above in conjunction with FIGS. 4A-4J. FIGS. 5A-5D depict a starting method utilizing a capstan or pulling wheel device, FIGS. 6A-6D depict a starting method utilizing a starting piece pre-welded to the bulk glass component, and FIGS. 7A-7E depict a starting method utilizing a starting piece welded to the bulk glass component in the oven or furnace.

Now referring specifically to FIGS. 5A-5D, a second method of starting the production process includes forming a drip by heating the bulk glass component in the oven. catching the drip with a pulling wheel device removably mounted beneath one or more gripper devices, pulling slowly on the drip with the pulling wheel device until the drip develops into a strand of the desired diameter, attaching the one or more gripper devices to the strand, and then removing the pulling wheel device.

Figure 5A:
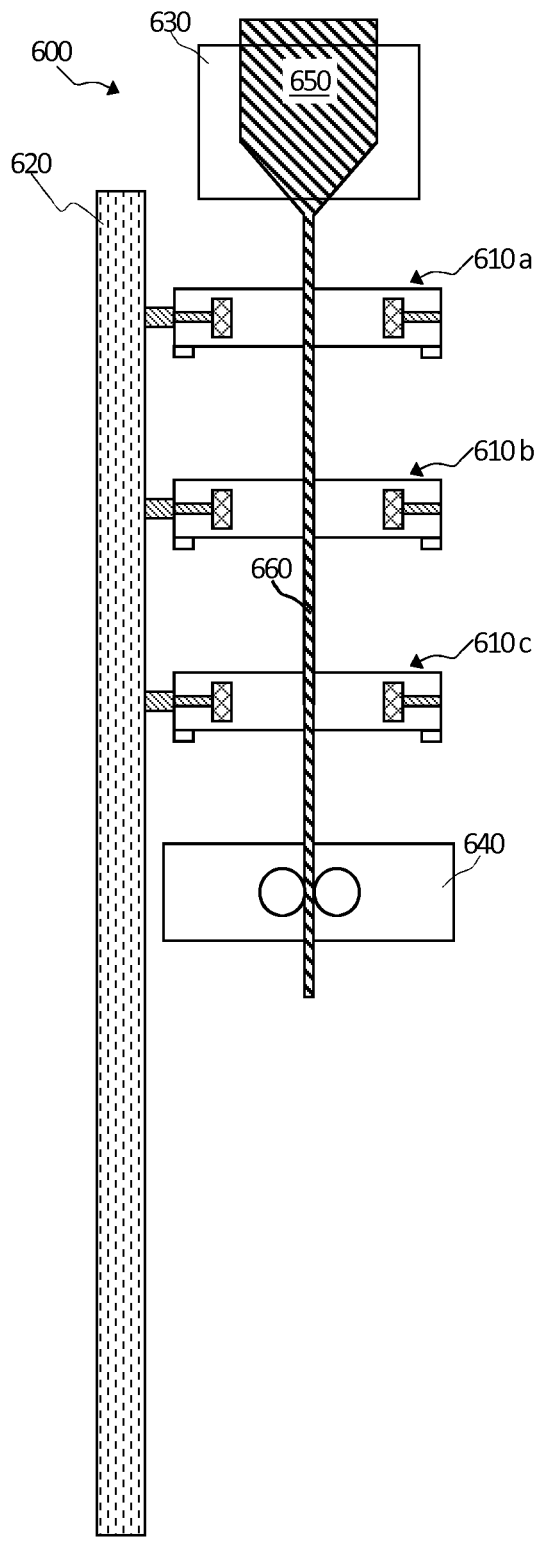
FIG. 5A is a side view of an apparatus for starting a process for forming a glass strand with low bow including three gripper devices and a removable pulling wheel device below the gripper devices, where the pulling wheel device is attached to a drip formed from a bulk glass component, according to an embodiment of the invention.

Referring to FIG. 5A, an apparatus 600 is provided including three gripper devices (a top gripper device 610a, a middle gripper device 610b, and a bottom gripper device 610c) attached to a tower 620, and a heating element 630, such as a furnace. The top gripper device 610a, the middle gripper device 610b, and the bottom gripper device 610c are substantially similar to the gripper device 210 described above. As is understood by those skilled in the art, certain steps included in the method 60 may be omitted; certain additional steps may be added; and the order of the steps may be altered from the order illustrated. While the apparatus 600 includes three gripper devices, it will be understood that the method described in conjunction with FIGS. 5A-5D may be performed with more than three gripper devices. The apparatus 600 further includes a pulling wheel device 640 removably mounted below the gripper devices 610a, 610b, 610c. The pulling wheel device 640 may be any device as is typically known in the art including two or more wheels driven by a motor to vary the rotation speed of the wheels. The spacing between the wheels may also be increased or decreased during operation to accommodate strands having varying diameters. First, a bulk glass component 650 is heated in the heating element 630 to form a drip 660 which is caught between the wheels of the pulling device 640.

Figure 5B:
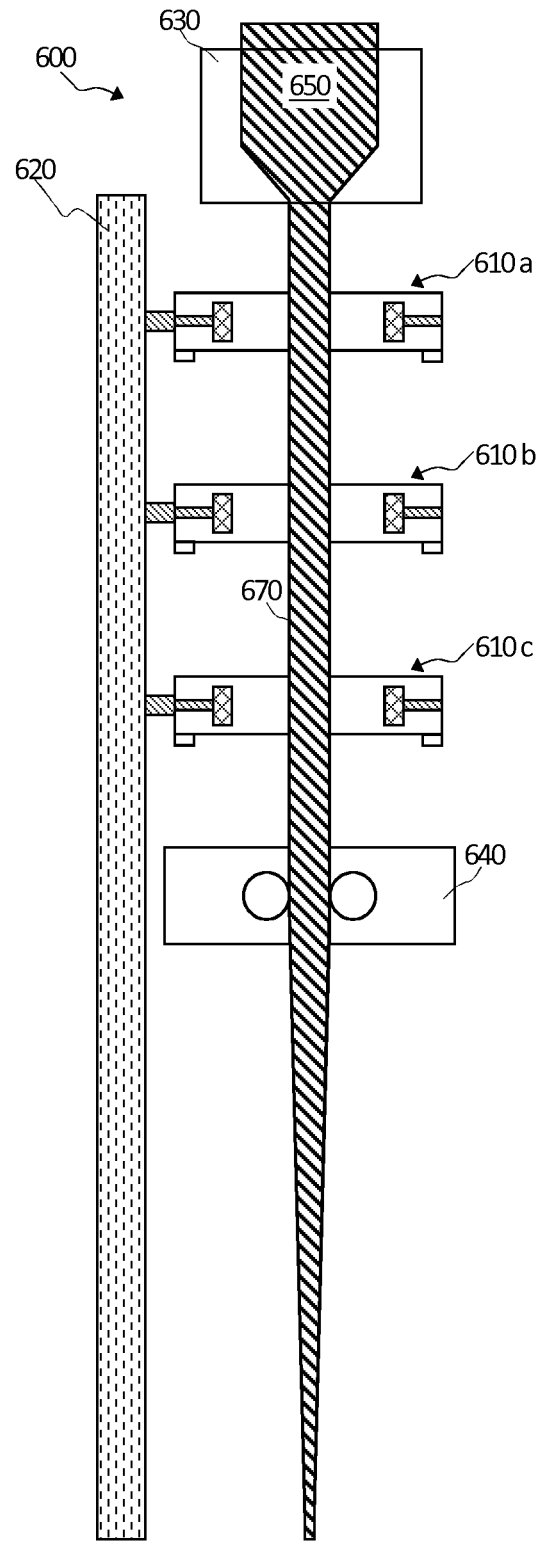
FIG. 5B is a side view of the apparatus of FIG. 5A, where the pulling wheel device has increased the diameter of the drip to form a strand, according to an embodiment of the invention.

Referring to FIG. 5B, the pulling wheel device 640 applies a force to the drip 660 to control the rate at which material flows from the bulk glass component 650 and out of the heating element 630. The pulling wheel device 640 may apply either a downward force or an upward force, where a downward force will increase the rate of draw and a upward force will decrease the rate of draw, though the pulling wheel device 640 will typically apply an upward force to decrease the rate of draw. By applying a force that results in less material passing through the pulling wheel device 640 than exits the heating element 630, the drip 660 will increase in diameter to form a strand 670. The difference in material flow rates out of the heating element 630 and through the pulling wheel device 640 should be sufficiently close to prevent the strand 670 from bowing.

Referring to FIG. 5C, the pulling process continues until the strand 670 reaches the desired diameter. Once the strand 670 reaches the desired diameter, the gripper devices 610a, 610b, 610c are attached to the strand 670 for support.

Referring to FIG. 5D, once the gripper devices 610a, 610b, 610c are attached to the strand 670, the pulling wheel device 640 is removed and the process described above in conjunction with FIGS. 4A-4J may begin. As depicted in FIG. 5C, a bottom portion of the strand below the bottom gripper device 610c may have an uneven diameter or a diameter less than the desired diameter. This bottom portion may be removed before the production process continues, as depicted in FIG. 5D.

Now referring specifically to FIGS. 6A-6D, a third method of starting the production process includes inserting into the furnace a bulk glass component with a starting piece pre-welded to the bulk glass component before heating the furnace. The gripper devices are then attached to the starting piece. The furnace is then heated until the bulk glass component softens enough to form a strand when the grippers pull down on the starting piece. Once the strand reaches a sufficient length, the gripper devices re-grip to the strand and the starting piece is removed.

Figure 6A:
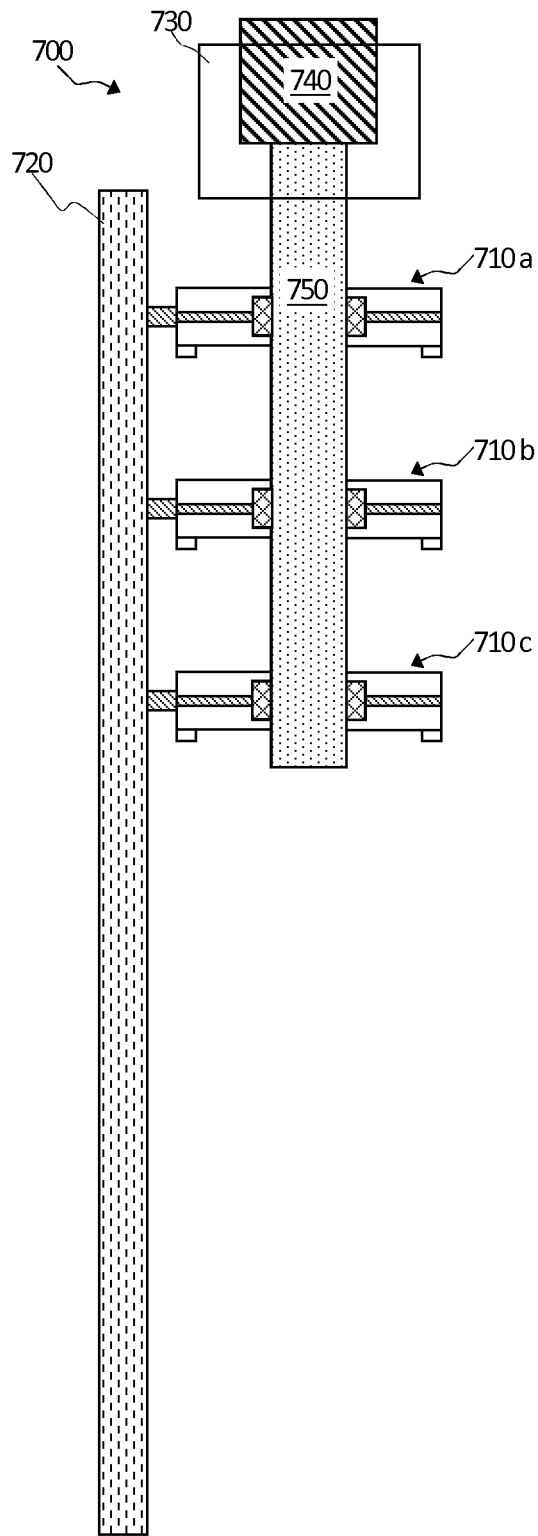
FIG. 6A is a side view of an apparatus for starting a process for forming a glass strand with low bow including three gripper devices attached to a starting piece pre-welded to a bulk glass component, according to an embodiment of the invention.

Referring to FIG. 6A, an apparatus 700 is provided including three gripper devices (a top gripper device 710a, a middle gripper device 710b, and a bottom gripper device 710c) attached to a tower 720, and a heating element 730, such as a furnace. As is understood by those skilled in the art, certain steps included in the method may be omitted; certain additional steps may be added; and the order of the steps may be altered from the order illustrated. While the apparatus 700 includes three gripper devices, it will be understood that the method described in conjunction with FIGS. 6A-6D may be performed with more than three gripper devices. The top gripper device 710a, the middle gripper device 710b, and the bottom gripper device 710c are substantially similar to the gripper device 210 described above.

First, a bulk glass component 740 is pre-welded (i.e., welded before being placed into the heating element 730) to a starting piece 750 and placed into the heating element 730 before heating the heating element 730. The starting piece 750 has approximately the diameter of the desired ultimate product and is held by the gripper devices 710a, 710b, 710c. The starting piece 750 may be made of glass of lower quality than the bulk glass component 740, which is made of the higher quality material intended for the ultimate product. In other embodiments, the starting piece 750 may also include a non-glass piece, such as a mechanical chuck. By utilizing the starting piece 750, waste of the bulk glass component 740 is avoided, thereby reducing process costs. Because the starting piece 750 is also supported above by the bulk glass component 740, the weight supported by the gripper devices 710a, 710b, 710c is initially approximately zero.

Figure 6B:
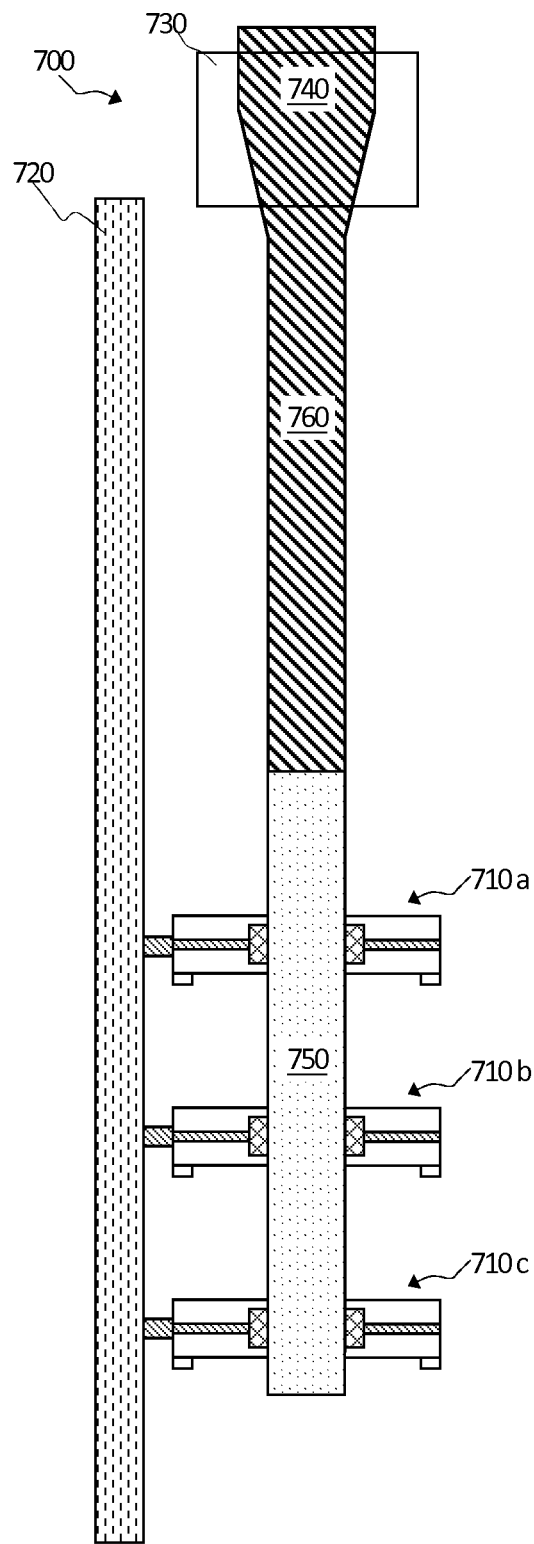
FIG. 6B is a side view of the apparatus of FIG. 6A, where the three gripper devices have been moved downward to form a strand between the starting piece and the bulk glass component, according to an embodiment of the invention.

Referring to FIG. 6B, the heating element 730 is then heated, causing the bulk glass component 740 to soften. Once the bulk glass component 740 reaches the desired viscosity, the gripper devices 710a, 710b, 710c pull down on the starting piece 750 to form a strand 760 between the starting piece 750 and the bulk glass component 740. The gripper devices 710a, 710b, 710c move downward at a rate so that the strand 760 has the desired diameter, approximately the same as the diameter of the starting piece 750. The viscosity of the bulk glass component 740 may be determined by measuring the weight supported by the gripper devices 710a, 710b, 710c, as an increased viscosity will result in more material flowing out of the heating element 730 and pushing down on the gripper devices 710a, 710b, 710c. The gripper devices 710a, 710b, 710c may begin moving once a predetermined weight is measured.

Figure 6C:
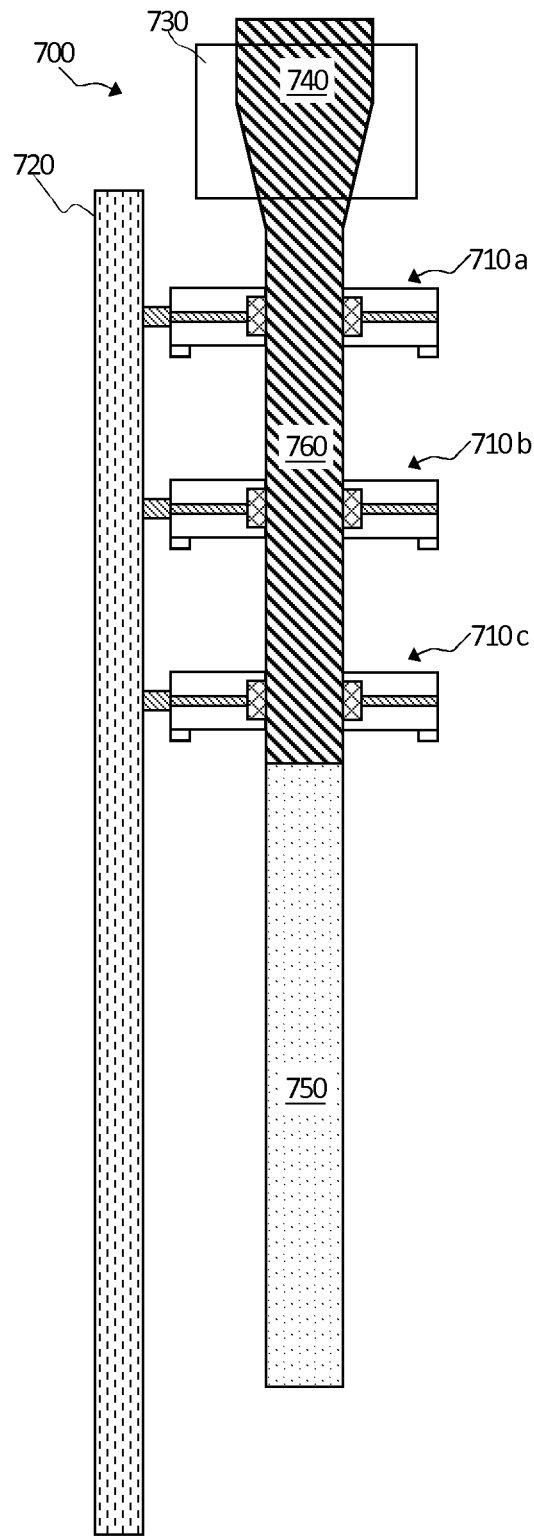
FIG. 6C is a side view of the apparatus of FIG. 6B, where the three gripper devices have been detached from the starting piece and reattached to the strand, according to an embodiment of the invention.

Referring to FIG. 6C, once the strand 760 reaches a sufficient length, the gripper devices 710a, 710b, 710c are unattached from the starting piece 750, moved back up, and reattached to the strand 760. The strand 760 has a sufficient length when there is room for all the gripper devices 710a, 710b, 710c to be attached the strand 760. The process of attaching and reattaching the gripper devices 710a, 710b, 710c may be accomplished according to the method described above in conjunction with FIGS. 4C-4H, where at least two of gripper devices 710a, 710b, 710c are attached to the strand at all times. In another embodiment, the regripping process may begin when the strand 760 has a sufficient length for just one or two of gripper devices 710a, 710b, 710c, with the remaining gripper devices being attached to the strand 760 as the strand 760 increases in length.

Figure 6D:
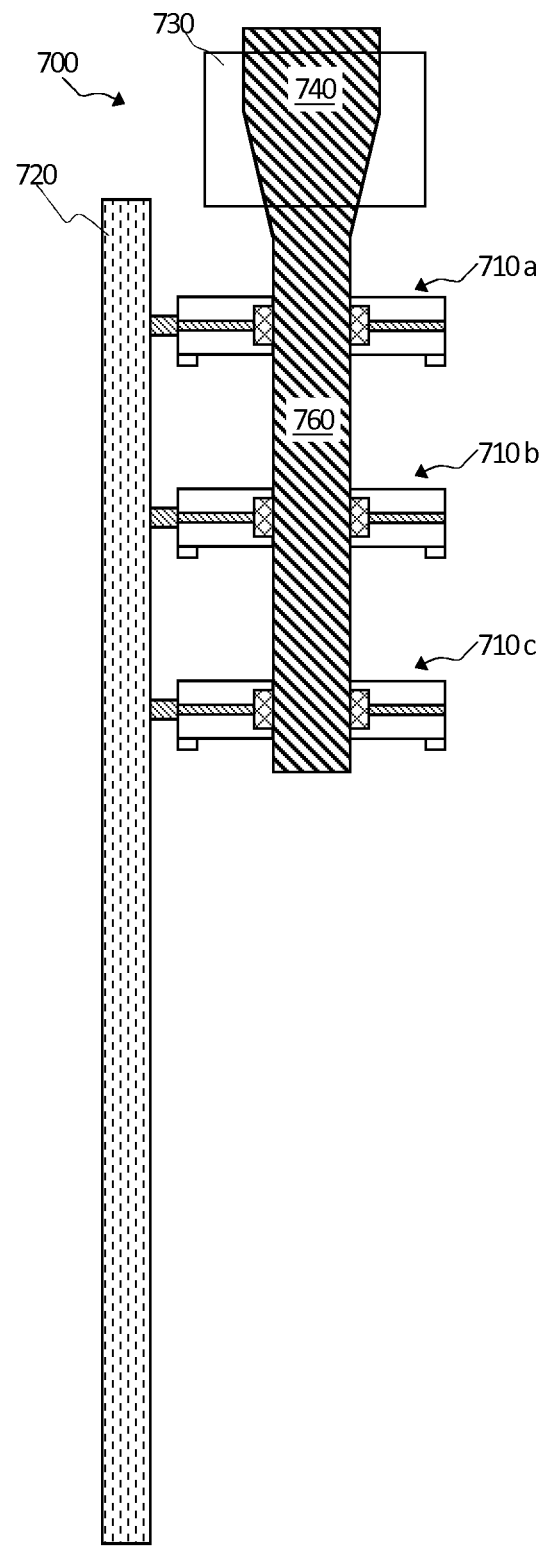
FIG. 6D is a side view of the apparatus of FIG. 6C, where the starting piece has been removed, according to an embodiment of the invention.

Referring to FIG. 6D, once all of the gripper devices 710a, 710b, 710c are attached to the strand 760 rather than the starting piece 750, the starting piece 750 is cut from the strand 760 and removed. Once the starting piece 750 is removed, the process described above in conjunction with FIGS. 4A-4J may begin.

Now referring specifically to FIGS. 7A-7E, a fourth method of starting the production process includes gripping a starting piece with the one or more gripper devices below the furnace, raising the starting piece into the furnace in contact with the bulk glass component, and then heating the furnace to weld the starting piece to the bulk glass component. As above, the grippers may then pull down on the starting piece to form a strand. Once the strand reaches a sufficient length, the gripper devices re-grip to the strand and the starting piece is removed.

Figure 7E:
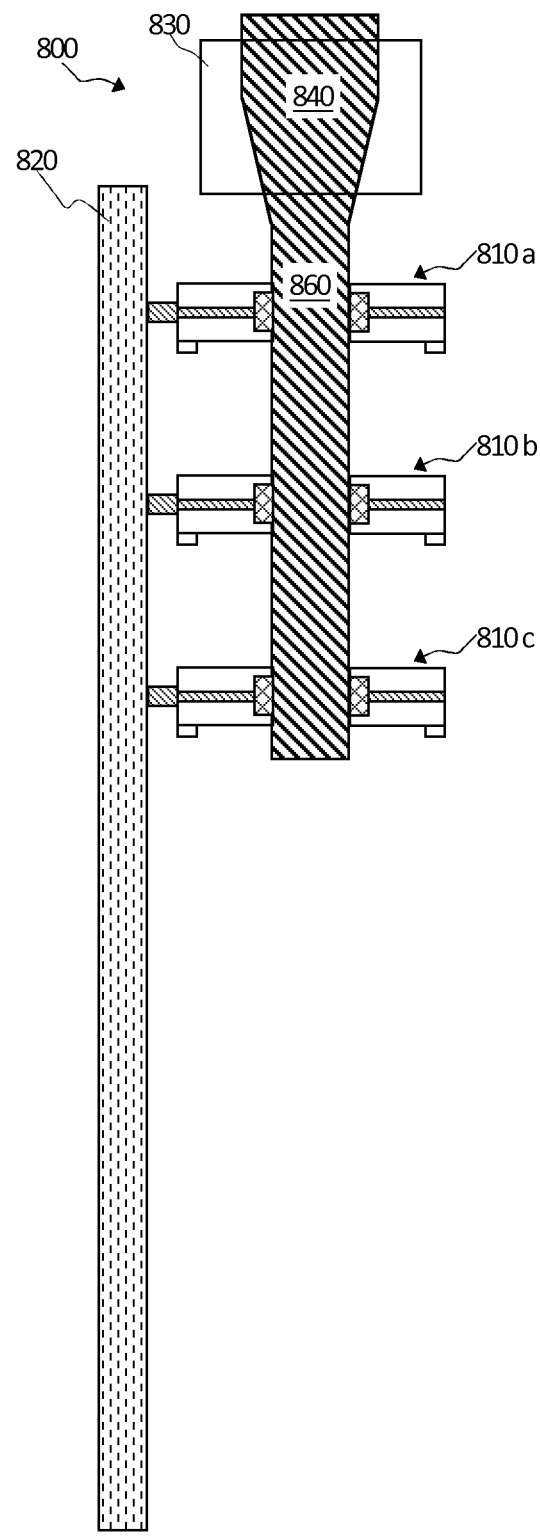
FIG. 7E is a side view of the apparatus of FIG. 7D, where the starting piece has been removed, according to an embodiment of the invention.

Referring to FIG. 7A, an apparatus 800 is provided including three gripper devices (a top gripper device 810a, a middle gripper device 810b, and a bottom gripper device 810c) attached to a tower 820, and a heating element 830, such as a furnace. As is understood by those skilled in the art, certain steps included in the method may be omitted; certain additional steps may be added; and the order of the steps may be altered from the order illustrated. While the apparatus 800 includes three gripper devices, it will be understood that the method described in conjunction with FIGS. 7A-7E may be performed with more than three gripper devices. The top gripper device 810a, the middle gripper device 810b, and the bottom gripper device 810c are substantially similar to the gripper device 210 described above.

Still to FIG. 7A, a bulk glass component 840 is placed into the heating element 830 and a starting piece 850 is gripped by the gripper devices 810a, 810b, 810c below the heating element 830 before heating the heating element 830. The starting piece 850 has approximately the diameter of the desired ultimate product and is held by the gripper devices 810a, 810b, 810c. The starting piece 850 may be made of glass of lower quality than the bulk glass component 840, which is made of the material intended for the ultimate product. In other embodiments, the starting piece 850 may also include a non-glass piece, such as a mechanical chuck. By utilizing the starting piece 850, waste of the bulk glass component 840 is avoided, thereby reducing process costs.

Referring to FIG. 7B, the starting piece 850 is raised by the gripper devices 810a, 810b, 810c into contact with the bulk glass component 840 and the heating element 830 is heated to weld the starting piece 850 to the bulk glass component 840.

Referring to FIG. 7C, once the starting piece 850 is welded to the bulk glass component 840, the heating element 830 is heated until the bulk glass component 840 reaches the desired viscosity. Once the bulk glass component 840 reaches the desired viscosity, the gripper devices 810a, 810b, 810c pull down on the starting piece 850 to form a strand 860 between the starting piece 850 and the bulk glass component 840. The gripper devices 810a, 810b, 810c move downward at a rate so that the strand 860 has the desired diameter, approximately the same as the diameter of the starting piece 850. The viscosity of the bulk glass component 840 may be determined by measuring the weight supported by the gripper devices 810a, 810b, 810c, as an increased viscosity will result in more material flowing out of the heating element 830 and pushing down on the gripper devices 810a, 810b, 810c. The gripper devices 810a, 810b, 810c may begin moving once a predetermined weight is measured.

Referring to FIG. 7D, once the strand 860 reaches a sufficient length, the gripper devices 810a, 810b, 810c are unattached from the starting piece 850, moved back up, and reattached to the strand 860. The strand 860 has a sufficient length when there is room for all the gripper devices 810a, 810b, 810c to be attached the strand 860. The process of attaching and reattaching the gripper devices 810a, 810b, 810c may be accomplished according to the method described above in conjunction with FIGS. 4C-4H, where at least two of gripper devices 810a, 810b, 810c are attached to the strand at all times. In another embodiment, the regripping process may begin when the strand 860 has a sufficient length for just one or two of gripper devices 810a, 810b, 810c, with the remaining gripper devices being attached to the strand 860 as the strand 860 increases in length.

Referring to FIG. 7E, once all of the gripper devices 810a, 810b, 810c are attached to the strand 860 rather than the starting piece 850, the starting piece 850 is cut from the strand 860 and removed. Once the starting piece 850 is removed, the process described above in conjunction with FIGS. 4A-4J may begin.

The foregoing description of preferred embodiments of the invention should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed:

1. An apparatus for forming an elongated component of glass with low bow, the apparatus comprising:
   a heating element to heat a bulk glass component such that a strand may be drawn from the bulk glass component in a downward z direction;
   a sensing element capable of locating a center axis of the strand;
   a force sensing device; and
   a gripper device in communication with the sensing element, wherein the gripper device comprises:
   clamping elements in communication with the force sensing device to support the strand and move linearly with the strand while it is drawn from the bulk glass component, wherein the clamping elements are capable of aligning in a first position on a strand wherein the first position is at about the center axis of the strand, and
   mounting elements attached to the clamping elements, wherein the mounting elements allow translational movement of the clamping elements to any position in an x-y plane,
   wherein the clamping elements will deflect along the mounting elements back to the first position when a force is sensed by the force sensing device while the strand is drawn from the bulk glass component.

2. The apparatus of claim 1, wherein the mounting element comprises an x-y table including a pair of arms mounted on linear bearings or linear rails.

3. The apparatus of claim 2, further comprising a motor to control movement of the pair of arms.

4. The apparatus of claim 1, wherein the mounting element further comprises a locking mechanism, wherein when the locking mechanism is disengaged the clamping element may float freely on the mounting element and when the locking mechanism is engaged the clamping element is fixed in position.

5. The apparatus of claim 1, wherein the force measuring device comprises a load cell.

6. The apparatus of claim 1, further comprising one or more additional gripper devices substantially similar to the gripper device.

* * * * *